(12) United States Patent
Furukawa et al.

(10) Patent No.: US 11,700,512 B2
(45) Date of Patent: Jul. 11, 2023

(54) INFORMATION PROCESSING APPARATUS, INFORMATION PROCESSING SYSTEM, AND INFORMATION PROCESSING METHOD

(71) Applicant: TOSHIBA TEC KABUSHIKI KAISHA, Tokyo (JP)

(72) Inventors: Yuki Furukawa, Ichihara Chiba (JP); Yohei Yanase, Meguro Tokyo (JP); Mayuko Tsunoda, Yokohama Kanagawa (JP); Yasuhiro Nakajima, Izunokuni Shizuoka (JP); Masaki Toumori, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/496,709

(22) Filed: Oct. 7, 2021

(65) Prior Publication Data
US 2022/0030399 A1    Jan. 27, 2022

Related U.S. Application Data

(63) Continuation of application No. 16/879,083, filed on May 20, 2020, now abandoned.

(30) Foreign Application Priority Data

Aug. 27, 2019  (JP) .................. 2019-154933

(51) Int. Cl.
*H04W 4/35*    (2018.01)
*G06K 7/10*    (2006.01)
*G06Q 10/087*  (2023.01)

(52) U.S. Cl.
CPC .......... *H04W 4/35* (2018.02); *G06K 7/10099* (2013.01); *G06Q 10/087* (2013.01)

(58) Field of Classification Search
CPC .......... H04W 4/35; H04W 4/33; H04W 4/80; G06K 7/10099; G06Q 10/087
See application file for complete search history.

(56) References Cited

U.S. PATENT DOCUMENTS

| | | | |
|---|---|---|---|
| 9,082,026 B2 | 7/2015 | Sano et al. | |
| 2016/0188930 A1* | 6/2016 | Zumsteg | G06K 7/0004 235/451 |
| 2018/0308040 A1* | 10/2018 | Trivelpiece | G06Q 10/087 |

FOREIGN PATENT DOCUMENTS

JP    2016-162178 A    9/2016

* cited by examiner

*Primary Examiner* — James J Yang
(74) *Attorney, Agent, or Firm* — Kim & Stewart LLP

(57) ABSTRACT

In accordance with an embodiment, an information processing apparatus uses a reader for reading tag information from an RF tag added to each of objects, to thereby manage the objects. The information processing apparatus includes a display device and a controller. The controller acquires information for identifying an allocated range of management of the objects at the information processing apparatus. The controller causes the display device to display individual progress information indicating by what degree of the allocated range reading by the reader has been finished.

9 Claims, 28 Drawing Sheets

WAREHOUSE MASTER

| WAREHOUSE CODE | WAREHOUSE NAME | AUTHENTICAT-ION KEY | DATA GENERATION DATA AND TIME | DATA WORK FLAG | 321 ... |
|---|---|---|---|---|---|
| 1000010001 | A COMPANY DISTRIBUTION CENTER FIRST WAREHOUSE | ******** | 20190901130101 | FALSE | ... |
| 1000010002 | A COMPANY DISTRIBUTION CENTER SECOND WAREHOUSE | ********* | 20190901130201 | TRUE | ... |
| 1000020001 | B COMPANY DISTRIBUTION CENTER P WAREHOUSE | ******** | 20190731220020 | FALSE | ... |
| ... | ... | ... | ... | ... | ... |

Fig. 3

THEORETICAL INVENTORY INFORMATION ⌒322

| MANAGE-MENT CODE | WAREHOUSE CODE | FLOOR CODE | AREA CODE | LOCATION | JAN CODE | INVENTORY QUANTITY | INVENTORY INFORMATION DATE AND TIME | ... |
|---|---|---|---|---|---|---|---|---|
| | 1000010001 | 1F | A | A-01-1 | 4911112222333 | 51 | 20190901130101 | ... |
| | 1000010002 | 1F | A | A-02-1 | 4911112222444 | 52 | 20190901130201 | ... |
| | 1000020001 | 2F | B | B-03-3 | 4933332222111 | 15 | 20190731220020 | ... |
| ... | ... | ... | ... | ... | ... | ... | ... | ... |

Fig. 4

OBJECT MANAGEMENT INFORMATION 323

| MANAG-EMENT CODE | WAREHOUSE CODE | FLOOR CODE | AREA CODE | LOCATION | JAN CODE | READING COUNT | THEOR-ETICAL COUNT | ADJUST-MENT COUNT | ACTUAL INVENTORY COUNT | STOCKING INFORMATION DATA AND TIME | PERSON-IN-CHARGE CODE | ... |
|---|---|---|---|---|---|---|---|---|---|---|---|---|
| | 1000010001 | 1F | A | A-01-1 | 4811112223333 | | | | | 20190301130101 | 0123458 | ... |
| | 1000010002 | 1F | A | A-02-1 | 4811112224444 | | | | | 20190301130201 | 0123456 | ... |
| | 1000020001 | 2F | B | B-03-3 | 4933332222111 | | | | | 20190731220000 | 1234567 | ... |
| | ... | ... | ... | ... | ... | ... | ... | ... | ... | ... | ... | ... |

Fig. 6

| STOCKTAKING WORK | | |
|---|---|---|
| FLOOR | AREA | |
| 1F | A1 | 〉 — 807 |
| 1F | A1 | 〉 — 807 |
| 1F | A1 | 〉 — 807 |
| 2F | A2 | 〉 |
| 2F | B2 | 〉 |
| 3F | A3 | 〉 — 807 |

| 11:06 | | |
|---|---|---|
| ← TO PREVIOUS SCREEN | PRODUCT NUMBER DESCRIPTION | SERIAL NO. 2 🔍SEARCH |
| COMMODITY CODE : | 4571486021224 | BARCODE |
| COMMODITY NAME : | LONG SKIRT 3 | 34360786952 |
| MANAGEMENT CODE : | 4571486021224 | |
| CATEGORY 1 : | All | |
| CATEGORY 2 : | OTHERS | QUANTITY 2/4 |

Fig. 27

| FLOOR | AREA | MANAGEM-ENT CODE | COMMODITY CODE | COMMOD-ITY NAME | READING COUNT | THEORET-ICAL COUNT | DIFFERENCE NUMBER | ADJUSTME-NT COUNT | ACTUAL INVE-NTORY COUNT | CATEG-ORY 1 | CATEG-ORY 2 | CATEG-ORY 3 |
|---|---|---|---|---|---|---|---|---|---|---|---|---|
| 1F | A | 123-45678 | 4519232000017 | PANTS | 0 | 53 | −53 | +30 | −23 | *** | *** | *** |
| 1F | A | 156-74837 | 4519232000024 | T SHIRT | 12 | 12 | 0 | | | *** | *** | *** |
| 1F | A | 222-99844 | 4519232000055 | T SHIRT | 30 | 12 | 18 | −18 | 30 | *** | *** | *** |
| 1F | EXCL-UDED | 256-84974 | 4519232000086 | DRESS | 30 | 0 | 30 | | | *** | *** | *** |
| 1F | A | 156-74837 | 4519232000024 | T SHIRT | 12 | 12 | 0 | | | *** | *** | *** |
| 1F | A | 156-74837 | 4519232000024 | T SHIRT | 12 | 12 | 0 | | | *** | *** | *** |
| 1F | A | 156-74837 | 4519232000024 | T SHIRT | 12 | 12 | 0 | | | *** | *** | *** |
| 1F | A | 156-74837 | 4519232000024 | T SHIRT | 12 | 12 | 0 | | | *** | *** | *** |

Fig. 28

| NARROWING-DOWN CONDITION | 0123456789 ▶ | DISPLAY |
|---|---|---|

WAREHOUSE NAME: TTTDISTRIBUTION CENTER [DATA NARROWING-DOWN CONDITION]

DOWNLOAD CSV

FLOOR: 1F    AREA: A

| LOCATION | MANAGEM-ENT CODE | COMMODITY CODE | COMMOD-ITY NAME | READING COUNT | THEORET-ICAL COUNT | DIFFERENCE NUMBER | ADJUSTME-NT COUNT | ACTUAL INVE-NTORY COUNT | CATEG-ORY 1 | CATEG-ORY 2 | CATEG-ORY 3 |
|---|---|---|---|---|---|---|---|---|---|---|---|
| 1F-A-03-1 | | | | | 3 | | | | | | |
| 1F-A-03-2 | 156-74837 | 4519232000024 | T SHIRT | 12 | 4 | | | | | | |
| 1F-A-03-3 | | | | | 5 | | | | | | |

REGISTRATION

| | | | | | | | | | | | |
|---|---|---|---|---|---|---|---|---|---|---|---|
| 1F | A | 156-74837 | 4519232000024 | T SHIRT | 12 | 12 | 0 | 0 | 0 | XS | *** | *** |
| 1F | A | 156-74837 | 4519232000024 | T SHIRT | 12 | 12 | 0 | | | *** | *** | *** |
| 1F | A | 156-74837 | 4519232000024 | T SHIRT | 12 | 12 | 0 | | | *** | *** | *** |
| 1F | A | 156-74837 | 4519232000024 | T SHIRT | 12 | 12 | 0 | | | *** | *** | *** |

INFORMATION PROCESSING APPARATUS, INFORMATION PROCESSING SYSTEM, AND INFORMATION PROCESSING METHOD

CROSS-REFERENCE TO RELATED APPLICATION

This application is a continuation of U.S. patent application Ser. No. 16/879,083, filed May 20, 2020, which is based upon and claims the benefit of priority from the prior Japanese Patent Application No. 2019-154933, filed on Aug. 27, 2019, the entire contents of which are incorporated herein by reference.

FIELD

An embodiment described here generally relates to an information processing apparatus, an information processing system, and an information processing method.

BACKGROUND

From the past, there is an information processing system that performs inventory management of objects by using radio frequency (RF) tags added to the objects at a store or the like. Such an information processing system performs stocktaking work by reading the RF tags through a tag reading apparatus. The stocktaking work ends when the number of theoretical inventories (theoretical count) obtained from object management information equals to the number of RF tags (reading count) actually read by the tag reading apparatus for example.

From the past, a server that accumulates pieces of tag information read by all tag reading apparatuses used in stocktaking work is capable of displaying a progress status (overall progress status) obtained by integrating all pieces of tag information. However, it is difficult to use each tag reading apparatus for grasping a progress status (individual progress status) allocated to the apparatus.

BRIEF DESCRIPTION OF THE DRAWINGS

FIG. 3 is a diagram showing an example of a warehouse master according to the embodiment as a table.

FIG. 4 is a diagram showing an example of theoretical inventory information according to the embodiment as a table.

FIG. 6 is a diagram showing an example of object management information according to the embodiment as a table.

FIG. 13 is a diagram showing an example of an allocated-range selection screen according to the embodiment.

FIG. 21 is a diagram showing an example of a stock number description screen according to the embodiment.

FIG. 24 is a diagram showing an example of the stock number description screen in a case of performing stocktaking using a barcode according to the embodiment.

FIG. 27 is a diagram showing an example of a detailed screen according to the embodiment.

FIG. 28 is a diagram showing an example of a commodity details screen according to the embodiment.

DETAILED DESCRIPTION

In accordance with one embodiment, an information processing apparatus sends/receives information to/from a server that comprehensively manages objects, to thereby manage objects of all the objects to be managed, which are within an allocated range. The information processing apparatus includes a communication device, a reader, a display device, a memory, and a controller. The communication device sends/receives information associated with the objects to be managed to/from the server. The reader reads, from a radio frequency (RF) tag added to each of the objects, tag information stored in the RF tag and outputs read data based on the tag information. The display device displays a progress status of management of the objects, which includes a progress status of reading by the reader. The memory stores information regarding the allocated range and the read data from the reader. The controller acquires, from the server via the communication device, information for identifying the allocated range for managing some of all the objects to be managed, which are selected. The controller causes the memory to store the acquired information as the information regarding the allocated range. The controller causes the display device to display individual progress information indicating by what degree of the allocated range reading by the reader has been finished on the basis of the information regarding the allocated range and the read data that are stored in the memory. The controller updates the individual progress information by causing the memory to store the read data in accordance with reading by the reader.

Figure 1:
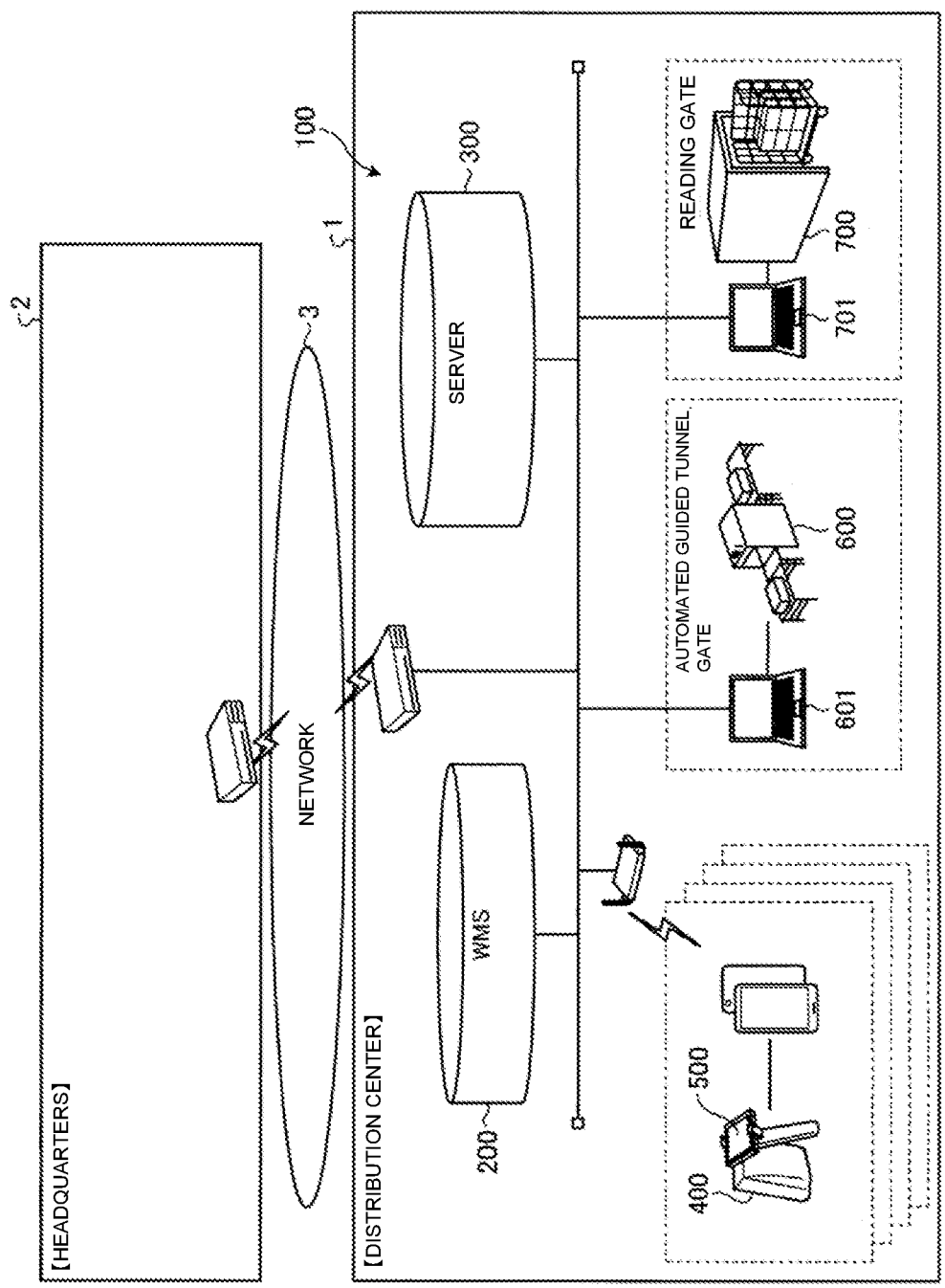
FIG. 1 is a diagram showing an information processing system according to an embodiment.

An embodiment will be described with reference to the drawings. In the drawings, identical symbols denote identical or similar parts. FIG. 1 shows an information processing system 100 according to the embodiment. The information processing system 100 is a system that manages objects (commodities, products) in a distribution center 1 for example.

The information processing system 100 includes a warehouse management system (WMS) 200, a server 300, a reader 400, a portable terminal 500, an automated guided tunnel gate 600, a terminal 601, a reading gate 700, a terminal 701, and the like.

The WMS 200 manages information regarding all objects acquired from the headquarters 2 via a network 3. The server 300 manages information regarding objects managed with radio frequency (RF) tags out of the information stored in the WMS 200. It should be noted that the RF tag is an example of an RF tag. The RF tag is an IC tag according to a technology that exchanges information by radio frequency identification (RFID), i.e., short-distance wireless communication using radio waves.

The reader 400 is an apparatus that communicates with an RF tag added to an object. The reader 400 reads tag information stored in the RF tag from the RF tag through wireless communication with the RF tag. The reader 400 may be a reader/writer also capable of writing information in the RF tag through wireless communication. For example, the reader 400 is a hand-held RFID reader/writer.

The portable terminal 500 is an example of an information processing apparatus. The portable terminal 500 is a smartphone, a tablet PC, a portable phone, a personal digital assistant (PDA), for example. A tag reading apparatus used for stocktaking (inventory management) work includes the reader 400 and the portable terminal 500 mounted on the reader 400. A single tag reading apparatus may be employed or a plurality of tag reading apparatuses may be employed.

The automated guided tunnel gate 600 reads tag information from an RF tag added to an object conveyed on a conveyor and outputs read data based on the read tag information to the terminal 601. The terminal 601 is a general personal computer (PC) for example.

The reading gate 700 reads the tag information from the RF tag added to the object placed on a passing cart or the like and outputs the read data based on the read tag information to the terminal 701. The terminal 701 is a general PC for example.

Hereinafter, a description will be given, assuming that the information processing system 100 according to the embodiment is used at an apparel shop that sells clothes and the like as an example of the store. The information processing system 100 according to the embodiment can be applied as long as it is a system that manages objects with RF tags added to the objects. The information processing system 100 may be used at a store that sells commodities other than clothes for example.

Figure 2:
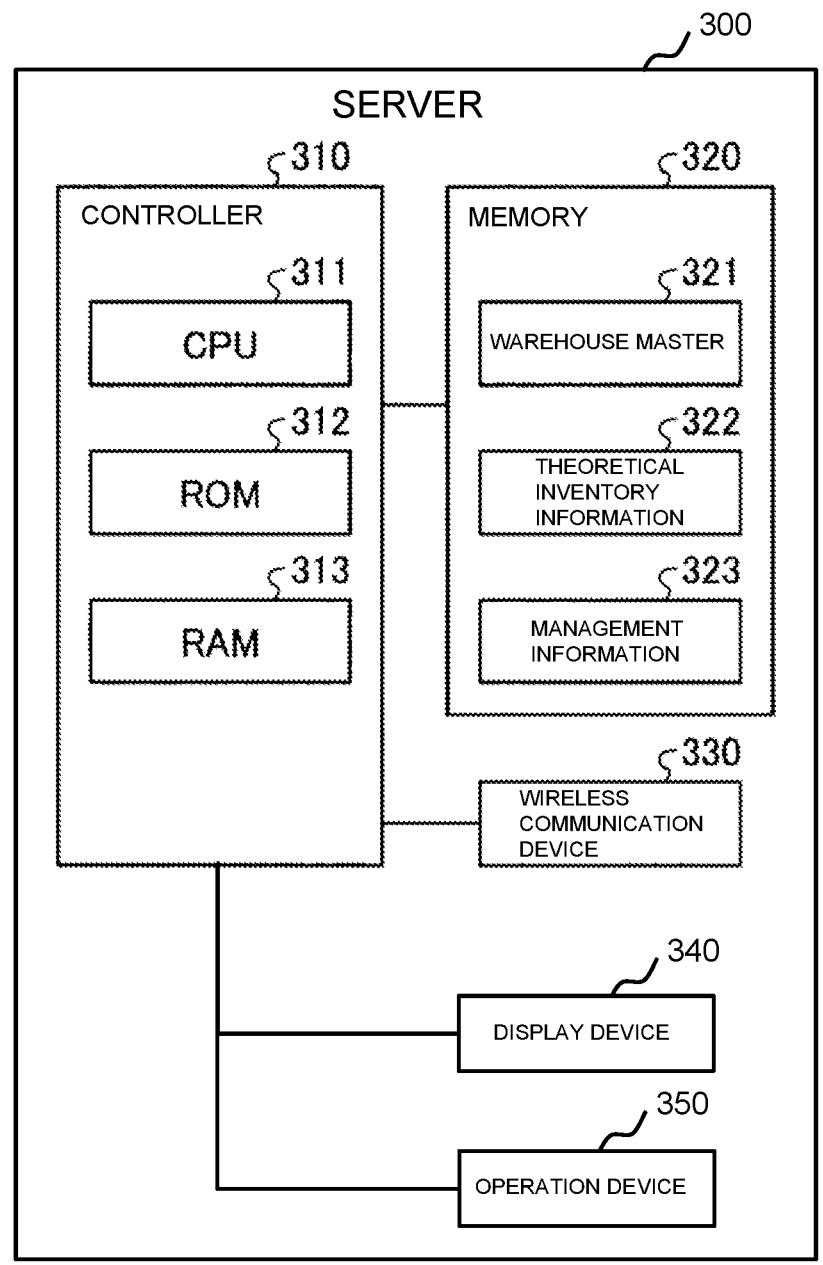
FIG. 2 is a block diagram showing an example of a server according to the embodiment.

FIG. 2 shows an example of the server 300. As shown in FIG. 2, the server 300 includes a controller 310, a memory 320, a wireless communication device 330, and the like. Moreover, the server 300 includes a display device 340 (a liquid-crystal display and the like) and an operation device 350 (a keyboard, a pointing device, and the like) like a general computer for example.

The controller 310 includes a central processing unit (CPU) 311, a read only memory (ROM) 312, and a random access memory (RAM) 313 for example. The CPU 311 is a processor and executes programs. The ROM 312 is a program memory and stores various types of programs and control data. The RAM 313 is a working memory and used for loading various types of data. The CPU 311 is connected to the ROM 312, the RAM 313, and the memory 320 via a data bus. The controller 310 comprehensively controls the respective blocks by the CPU 311 reading programs stored in the ROM 312 into the RAM 313 and executing the read programs.

The memory 320 is a rewritable nonvolatile memory. The memory 320 includes an HDD, a flash memory, and the like in which stored information is retained also after it is powered off for example. The memory 320 stores a control program or control data and the like. For example, a control program can be installed as appropriate into the memory 320.

The memory 320 stores a warehouse master 321, theoretical inventory information 322, and management information 323. FIG. 3 shows an example of information included in the warehouse master 321 stored in the memory 320 as a table. As shown in FIG. 3, the memory 320 has stored information regarding a warehouse code, a warehouse name, an authentication, data generation date and time, a data deletion flag, and the like for example as the warehouse master 321.

The warehouse code is identification information for uniquely identifying a warehouse. The warehouse code includes a number with a predetermined number of digits for example. The warehouse name is the name of the warehouse with which the warehouse code of the same record is associated. The authentication key is a password (a warehouse key) entered on a log-in screen of the warehouse indicated by the warehouse code of the same record. The data generation date and time are generation date and time of the record (master data). The data deletion flag is a flag indicating whether or not the record has been deleted. The data deletion flag is "TRUE" if the record has been deleted or "FALSE" if not.

FIG. 4 shows an example of information contained in the theoretical inventory information 322 stored in the memory 320 as a table. As shown in FIG. 4, the memory 320 has stored information regarding a management code, a warehouse code, a floor code, an area code, a location, a JAN code, the inventory count, inventory information date and time, and the like for example as the theoretical inventory information 322.

The management code is a unique code for uniquely identifying each record. The warehouse code is identical to the warehouse code stored in the warehouse master 321. The warehouse code is identification information for uniquely identifying a warehouse and includes a number with a predetermined number of digits for example. The floor code is identification information for uniquely identifying a floor. The floor code includes a number with a predetermined number of digits for example. The floor code is managed by a floor master (not shown). The area code is identification information for uniquely identifying an area. The area code includes a number with a predetermined number of digits for example. The area code is managed by an area master (not shown).

Figure 5:
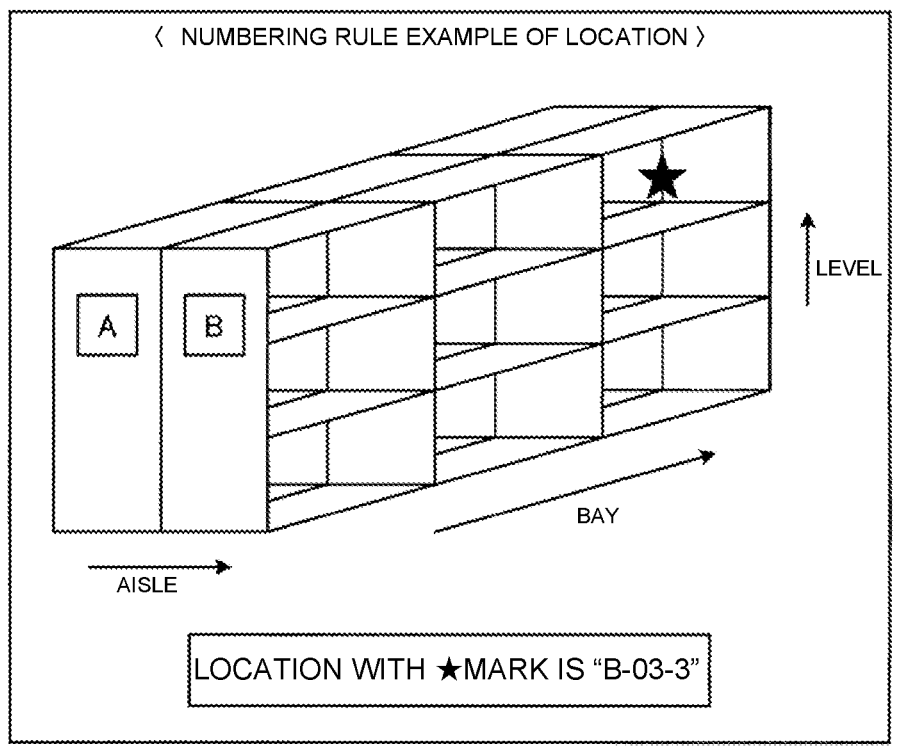
FIG. 5 is a diagram showing an example of a location numbering rule according to the embodiment.

The location is identification information for identifying a location number within a warehouse. FIG. 5 shows an example of a location numbering rule. For example, it is assumed that three racks with three levels are arranged next to one another in an aisle with an area code "B" on a certain floor. In this case, a location at the top level (third from the bottom) on the deepest side (third bay from the front) is expressed as "B-03-3" for example.

The JAN code is a JAN code indicating an object in stock. The inventory count is the theoretical inventory count in the location of the same record, which relates to the object with that JAN code. The inventory information date and time are generation date and time of that record (inventory information data).

FIG. 6 shows an example of information contained in the object management information 323 stored in the memory 320 as a table. The object management information 323 is updated on the basis of information indicating a result of stocktaking work which is acquired from each portable terminal 500 (e.g., read data and the like based on tag information of RF tags).

As shown in FIG. 6, the memory 320 has stored a management code, a warehouse code, a floor code, an area code, a location, a JAN code, a reading count, a theoretical count, an adjustment count, an actual inventory count, stocktaking information date and time, person-in-charge code, and the like for example as the object management information 323. The management code, the warehouse code, the floor code, the area code, the location, and the JAN code are similar to those described above, and thus detailed descriptions thereof will be omitted. It should be noted that the theoretical inventory information 322 and the object management information 323 are made to correspond to each other with the management code.

The reading count is a value based on read data acquired from the portable terminal 500. The theoretical count is the theoretical inventory count of an object. The adjustment count is the number of objects not contained in the read data due to a RF tag error or the like but confirmed to be in stock for example. The actual inventory count is the sum of the reading count and the adjustment count.

The stocktaking information date and time are date and time at which stocktaking in the location of the same record was performed. The person-in-charge code is identification information for uniquely identifying a person-in-charge and includes a number with a predetermined number of digits for example.

The wireless communication device 330 is a communication interface for communicating with the portable terminal 500. For example, the wireless communication device 330 performs wireless communication by using a region where the stocktaking work is performed (e.g., a place of objects in stock or the like within the warehouse) as the communication range.

The controller 310 transfers an instruction to the portable terminal 500 via the wireless communication device 330 when starting the stocktaking work for example. The instruction includes information (information regarding an allocated range) of the theoretical inventory information 322, the information regarding an object(s) that should be present in an area selected as a target of stocktaking.

Moreover, the wireless communication device 330 receives the information (read data) indicating a result of stocktaking work from each portable terminal 500. The controller 310 acquires read data from a plurality of portable terminals 500 via the wireless communication device 330 for example. The controller 310 updates the object management information 323 stored in the memory 320 by performing double check or the like on the acquired read data.

Figure 7:
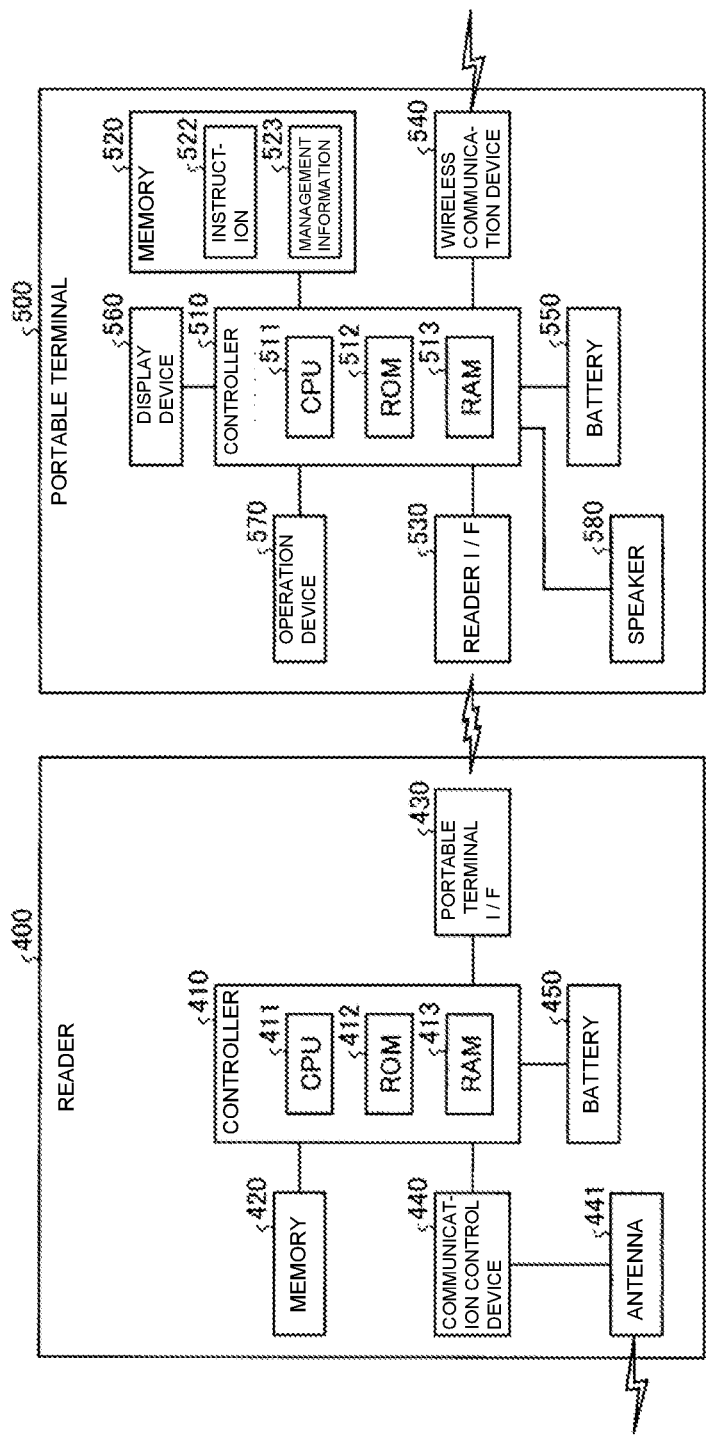
FIG. 7 is a block diagram showing an example of a reader and a portable terminal according to the embodiment.

FIG. 7 shows an example of the reader 400 and the portable terminal 500. As shown in FIG. 7, the reader 400 includes a controller 410, a memory 420, a portable terminal interface (I/F) 430, a communication control device 440, an antenna 441, a battery 450, and the like. Moreover, the portable terminal 500 includes a controller 510, a memory 520, a reader I/F 530, a wireless communication device 540, a battery 550, a display device 560, an operation device 570, a speaker 580, and the like.

The controller 410 of the reader 400 includes a CPU 411, a ROM 412, and a RAM 413 for example. The CPU 411 is a processor and executes programs. The ROM 412 is a program memory and stores various types of programs and control data. The RAM 413 is a working memory and used for loading various types of data. The CPU 411 is connected to the ROM 412, the RAM 413, and the memory 420 via a data bus. The controller 410 comprehensively controls the respective blocks by the CPU 411 reading programs stored in the ROM 412 into the RAM 413 and executing the read programs.

The memory 420 is a rewritable nonvolatile memory. The memory 420 includes a flash memory or the like in which stored information is retained also after it is powered off for example. The memory 420 stores a control program or control data and the like. For example, a control program can be installed as appropriate into the memory 420.

The portable terminal I/F 430 is a communication interface for communicating with the portable terminal 500. The portable terminal I/F 430 is communicably connected to the reader I/F 530 of the portable terminal 500. The portable terminal I/F 430 sends to the portable terminal 500 read data based on tag information output by the communication control device 440 (information stored in the RF tag, which is an example of information indicating a result of stocktaking work).

The communication control device 440 connects to the antenna 441. The communication control device 440 wirelessly communicates with the RF tag via the antenna 441. The antenna 441 emits radio waves in accordance with the control of the communication control device 440 and receives the tag information as response waves from the RF tag that has received those radio waves. The antenna 441 outputs the received tag information to the communication control device 440.

In the embodiment, RF tags added to objects to be managed store electronic product code (EPC) data (tag information) including information to be described later. For example, the communication control device 440 emits radio waves for sending a "response request" to request tag information to an RF tag added to an object such as clothes via the antenna 441. The RF tag is activated with received radio waves and sends the tag information stored in that RF tag with response radio waves. The communication control device 440 receives response radio waves from the RF tag via the antenna 441. The communication control device 440 reads the tag information from the RF tag in accordance to a predetermined standard. For example, the standard for wireless communication with the RF tag is ISO/IEC 18000-6 TypeC (EPC global Class1 Generation2) or the like. The communication control device 440 causes the RAM 413 or the memory 420 to store the read data based on the tag information contained in the received response radio waves.

The battery 450 supplies the respective blocks of the reader 400 with electric power.

The controller 510 of the portable terminal 500 includes a CPU 511, a ROM 512, and a RAM 513 for example. The CPU 511 is a processor and executes programs. The ROM 512 is a program memory and stores various types of programs and control data. The RAM 513 is a working memory and used for loading various types of data. The CPU 511 is connected to the ROM 512, the RAM 513, and the memory 520 via a data bus. The controller 510 comprehensively controls the respective blocks by the CPU 511 reading programs stored in the ROM 512 into the RAM 513 and executing the read programs.

The memory 520 is a rewritable nonvolatile memory. The memory 520 includes a flash memory or the like in which stored information is retained also after it is powered off for example. The memory 520 stores a control program or control data and the like. For example, a control program can be installed as appropriate into the memory 520. Moreover, the memory 520 stores data transferred from the server 300 and the like.

The memory 520 has stored an instruction 522 and management information 523. The instruction 522 is transferred from the server 300 when starting the stocktaking work. The instruction 522 includes information of the theoretical inventory information 322, which relates to an object(s) that should be present in an area selected as a target of stocktaking.

The management information 523 is data used for updating the management information 323. The management information 523 includes read data in format conforming to the management information 323.

The reader I/F 530 is a communication interface for communicating with the reader 400. The reader I/F 530 is communicably connected to the portable terminal I/F 430 of the reader 400. The controller 510 sends/receives various types of information including remaining battery charge information to/from the reader 400 via the reader I/F 530. The reader I/F 530 receives the tag information (read data) from the reader 400. The controller 510 acquires the tag information from the reader 400 through the reader I/F 530. The controller 510 performs double check or the like on the tag information contained in the acquired read data and causes the memory 520 to store the acquired tag information (read data) as the management information 523.

Here, it is sufficient that the reader I/F 530 and the portable terminal I/F 430 are capable of performing communication connection with each other. The reader I/F 530 and the portable terminal I/F 430 may be wireless communication interfaces or may be contact type interfaces. The portable terminal I/F 430 and the reader I/F 530 may be interfaces that are communicably connected to each other through near field communication (NFC) for example.

The wireless communication device 540 is a communication interface for communicating with the server 300 and the like. For example, the wireless communication device 540 wirelessly communicates with a region where the stocktaking work is performed (e.g., the place of objects in stock or the like within the warehouse) as the communication range. For starting the stocktaking work for example, the wireless communication device 540 receives from the server 300 a transferred instruction including information regarding an object that is a target of stocktaking performed by itself (portable terminal 500). Moreover, the controller 510 sends information indicating a result of stocktaking work, which has been accumulated in the memory 520, to the server 300 through the wireless communication device 540 at a predetermined timing. For example, the wireless communication device 540 sends to the server 300 read data (tag information) of an RF tag, input information entered by an operator, and the like as the information indicating the result of stocktaking work.

A battery 550 supplies the respective blocks of the portable terminal 500 with electric power. The display device 560 is a display device such as a liquid-crystal display for example and displays information for the operator on the display screen. The operation device 570 is a touch panel superimposed on the display device 560 for example and receives an operation such as information input according to the display of the display device 560. It should be noted that the operation device 570 may include a mechanical hard key. The speaker 580 functions as an informing unit. The speaker 580 has a function of making a buzzing sound for example. The speaker 580 makes a buzzing sound as a sound for alerting the operator.

Figure 8:
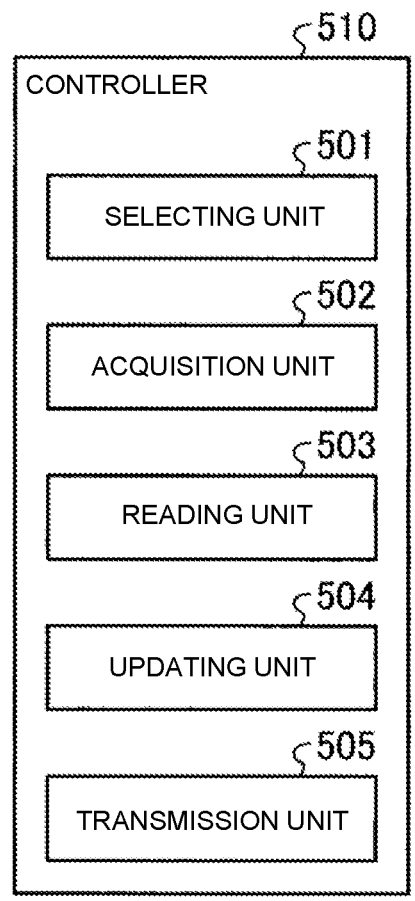
FIG. 8 is a block diagram showing an example of functional units of a controller according to the embodiment.

FIG. 8 shows an example of the functional units of the controller 510. The controller 510 functions as a selecting unit 501, an acquisition unit 502, a reading unit 503, an updating unit 504, and a transmission unit 505 by executing the program.

The selecting unit 501 receives selection of a target of stocktaking (allocated range). The acquisition unit 502 acquires information regarding an object included in the allocated range selected by the selecting unit 501 out of the theoretical inventory information 322 stored in the server 300. The acquisition unit 502 causes the memory 520 to store the information regarding the acquired objects as the instruction. Here, the instruction is an example of information for identifying an allocated range selected to include some of the objects to be managed.

The reading unit 503 controls the reader 400 that reads an RF tag in accordance with an operator's operation and starts, suspends, or terminates tag reading. The updating unit 504 updates the individual progress information in accordance with tag reading and reflects the updated individual progress information regarding the screen. Here, the individual progress information is information indicative of by what degree of the allocated range reading by the reader 400 has been finished.

The transmission unit 505 sends to the server 300 the read data based on the tag information read by the reader 400 under the control of the reading unit 503 at a predetermined timing. More specifically, the transmission unit 505 sends to the server 300 the tag information (read data) stored in the memory 520 after the end of tag reading of the reader 400 under the control of the reading unit 503.

Figure 9:
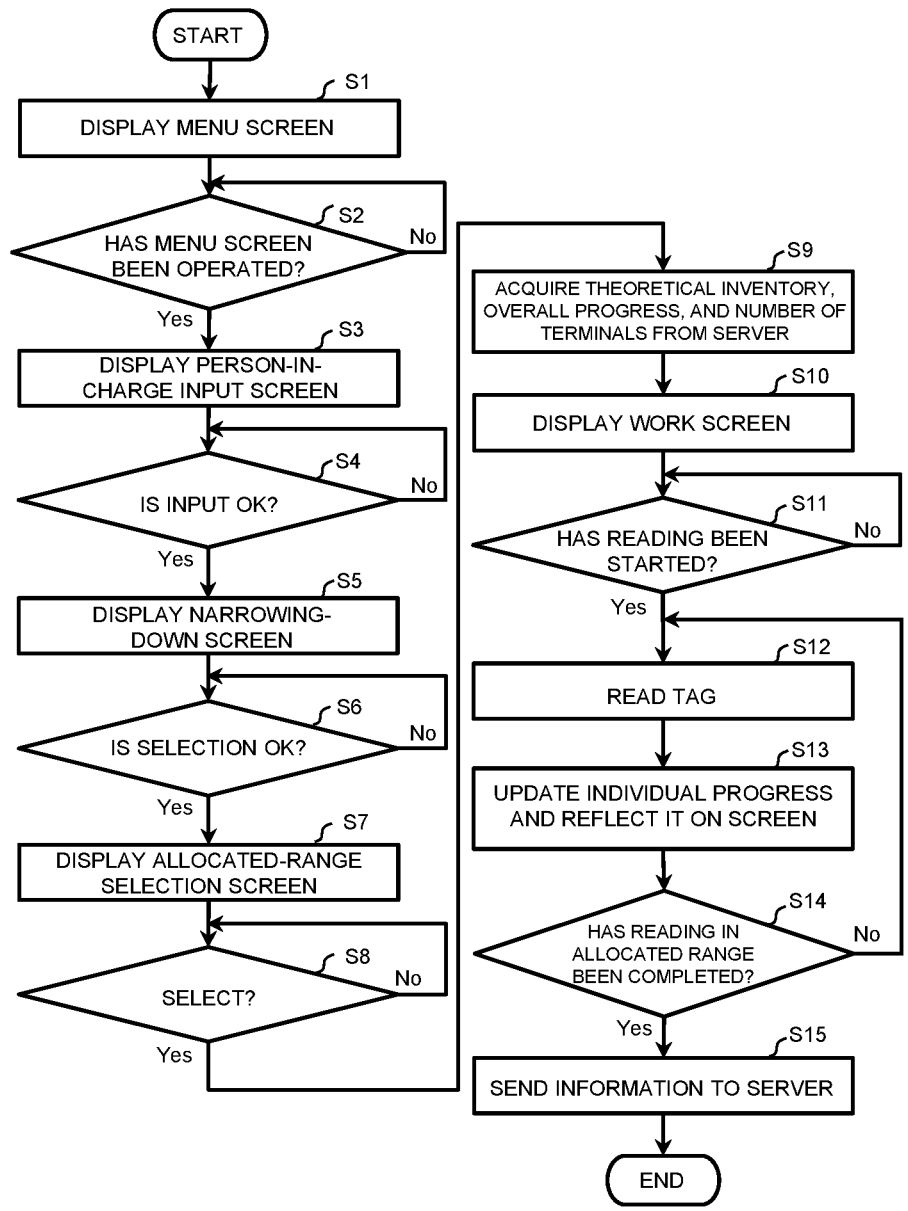
FIG. 9 is a flowchart showing an example of processing to be performed by a controller of a portable terminal 500 according to the embodiment.

FIG. 9 shows an example of processing of performing the controller 510 of the portable terminal 500. This processing will be described with reference to various screens (FIGS. 10 to 24) displayed by the display device 560 of the portable terminal 500.

Figure 10:
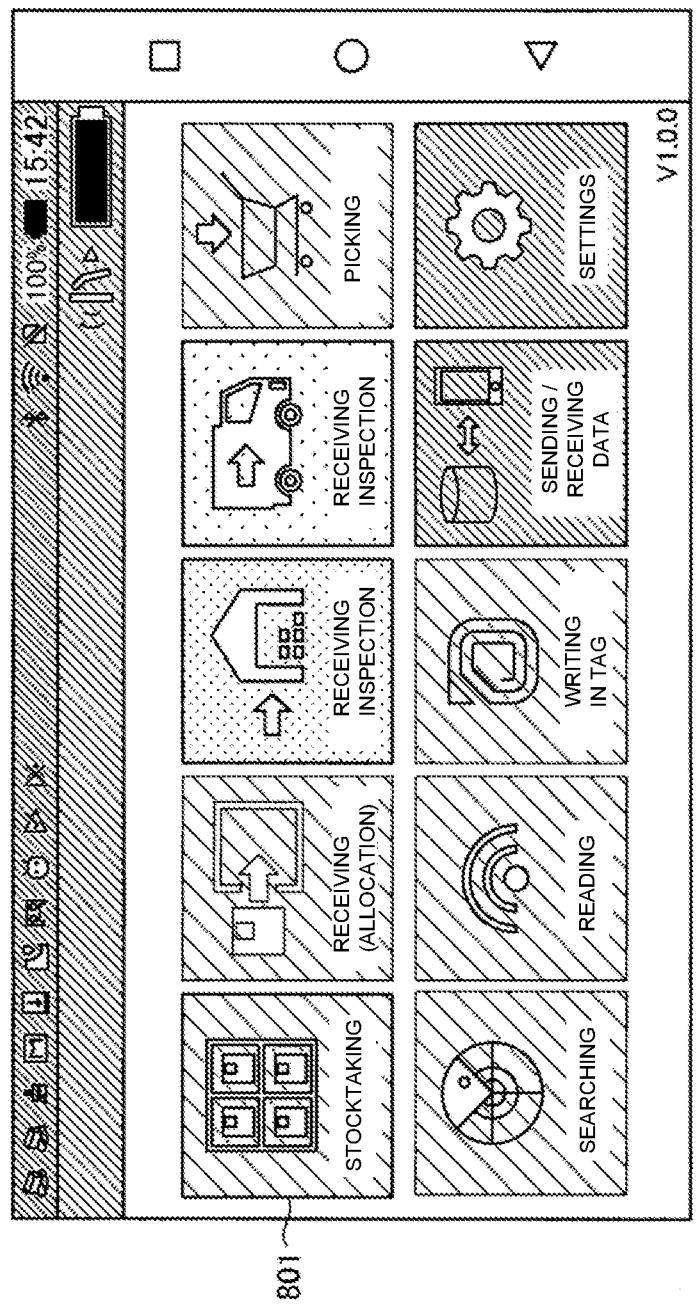
FIG. 10 is a diagram showing an example of a menu screen according to the embodiment.

As shown in FIG. 9, in Step S1, the controller 510 causes the display device 560 to display a menu screen. FIG. 10 shows an example of the menu screen. As shown in FIG. 10, the menu screen includes a button 801 for activating a stocktaking application and buttons for activating various other applications. An operation received by each button is entered into the controller 510 via the operation device 570 (touch panel).

Figure 11:
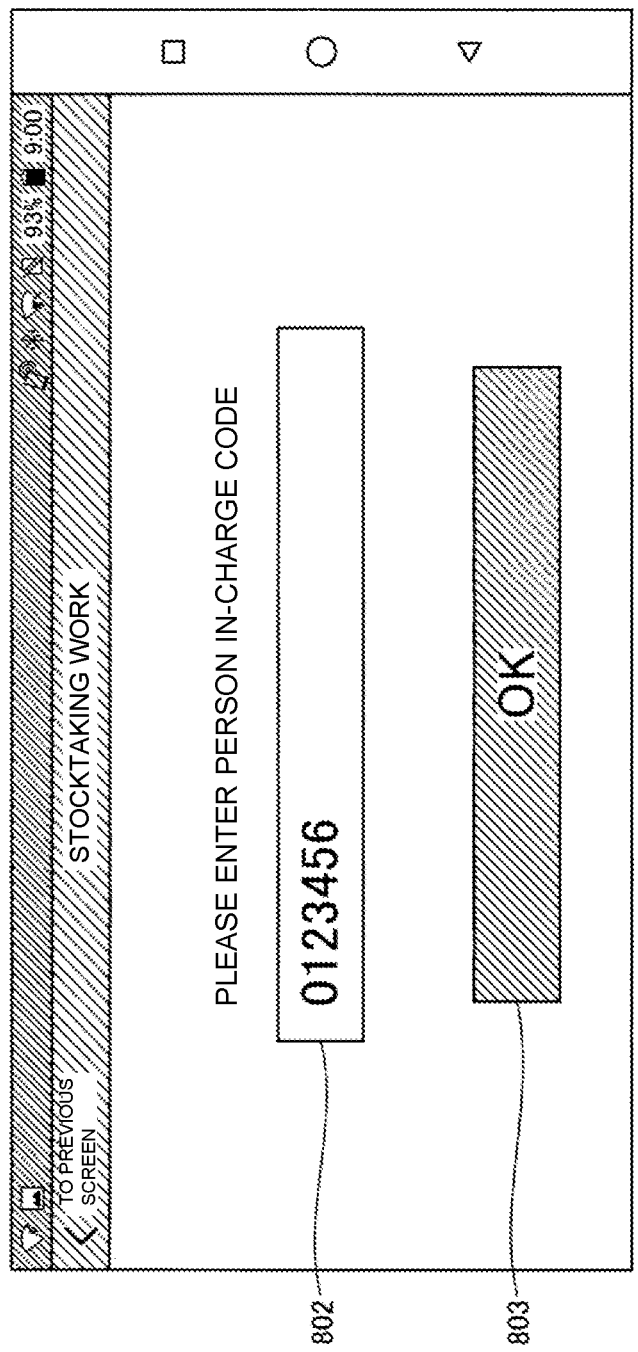
FIG. 11 is a diagram showing an example of a person-in-charge input screen according to the embodiment.

The controller 510 waits for reception of an operation through the operation device 570 (No in Step S2). In a case where the controller 510 determines that the button 801 receives the operation on the menu screen (Yes in Step S2), the processing of the controller 510 proceeds to Step S3. In Step S3, the controller 510 causes the display device 560 to display a person-in-charge input screen. FIG. 11 shows an example of the person-in-charge input screen. As shown in FIG. 11, the person-in-charge input screen includes a person-in-charge code entry field 802 and an OK button 803. The person-in-charge code entry field 802 receives input of the person-in-charge code which is identification information for identifying a person-in-charge (operator).

Figure 12:
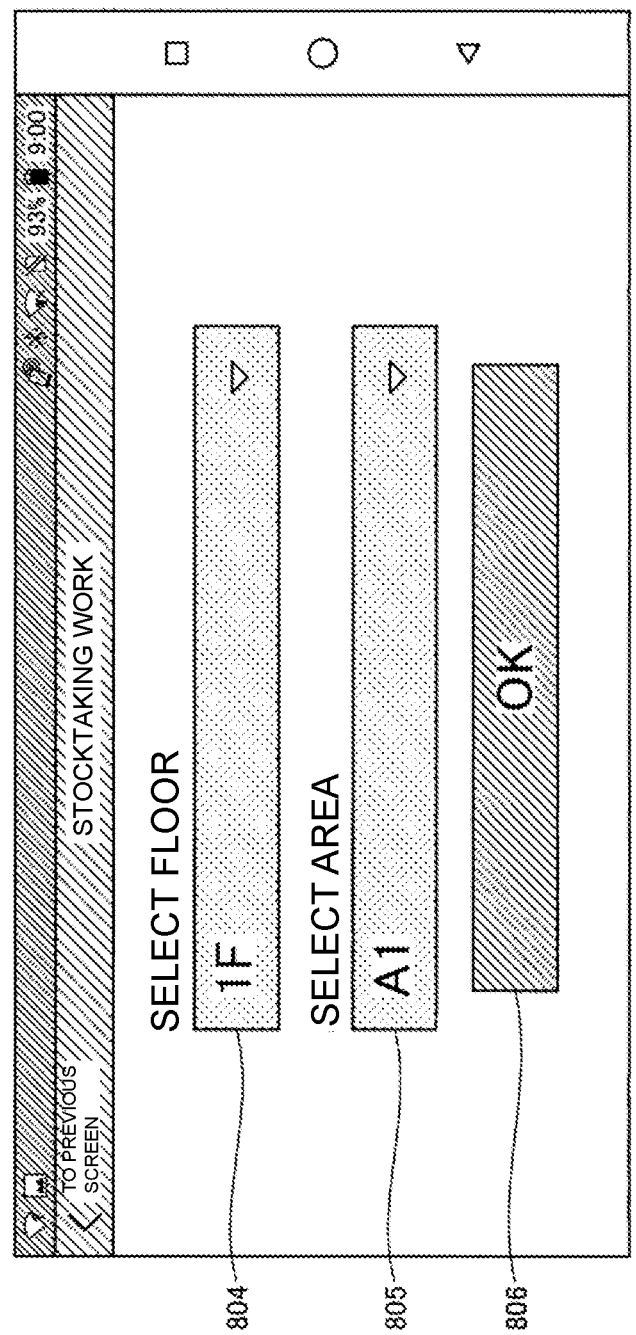
FIG. 12 is a diagram showing an example of a narrowing-down screen according to the embodiment.

The controller 510 waits for reception of input and operation via the operation device 570 (No in Step S4). In a case where the controller 510 determines that the person-in-charge code is entered into the person-in-charge code entry field 802 and the OK button 803 receives the operation (Yes in Step S4), the processing of the controller 510 proceeds to Step S5. In Step S5, the controller 510 causes the display device 560 to display a narrowing-down screen. FIG. 12 shows an example of the narrowing-down screen. As shown in FIG. 12, the narrowing-down screen includes a floor selection portion 804, an area selection portion 805, and an OK button 806. The floor selection portion 804 receives floor selection from a pull-down menu. The area selection portion 805 receives area selection from the pull-down menu.

Figure 13:
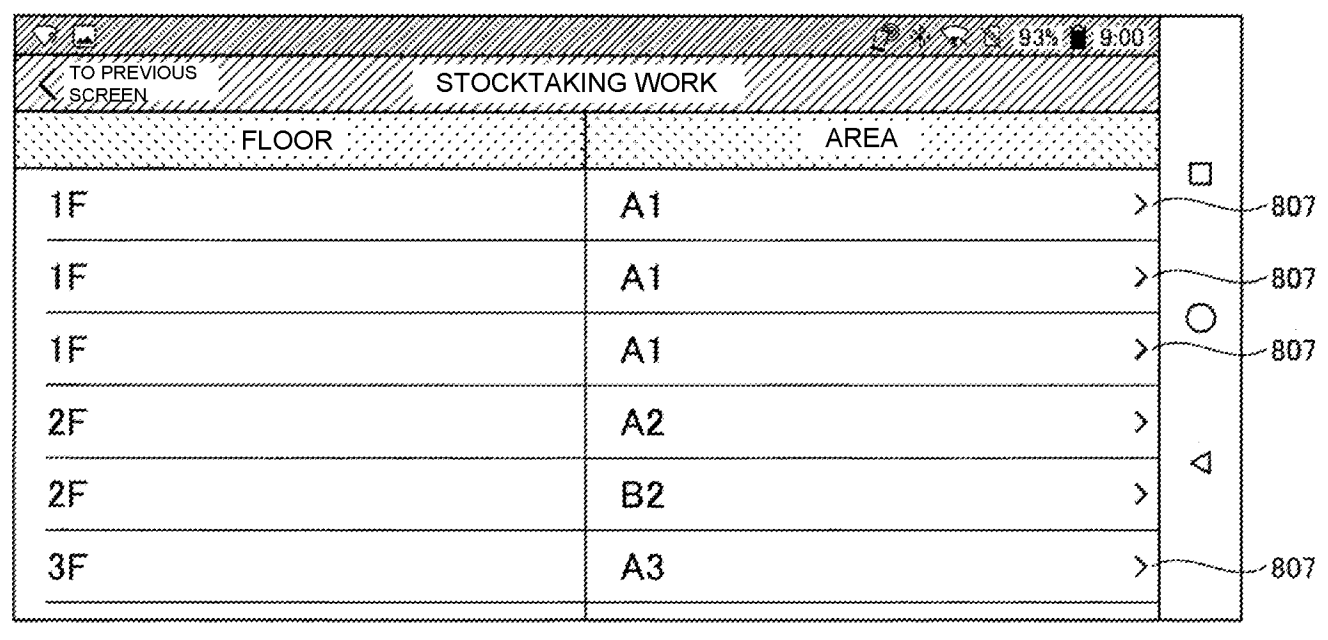

The controller 510 waits for reception of selection and an operation via the operation device 570 (No in Step S6). In a case where the controller 510 determines that the floor and the area are selected and the OK button 806 receives the operation (Yes in Step S6), the processing of the controller 510 proceeds to Step S7. In Step S7, the controller 510 causes the display device 560 to display the allocated-range selection screen. FIG. 13 shows an example of the allocated-range selection screen. As shown in FIG. 13, the allocated-range selection screen displays one or more allocated ranges included in the floor and the area selected on the narrowing-down screen that is the previous screen as a list. Selection keys 807 are displayed in each row of the list as shown in FIG. 13.

It should be noted that except for the allocated ranges whose status (described later) is "Already written" or "Complete", the allocated-range selection screen shown in FIG. 13 displays only allocated ranges whose status is "Not performed" or "Now performing". The status "Already written" indicates that the stocktaking work has been already completed and a result has been reflected on the WMS 200. Moreover, the status "Complete" indicates that the stocktaking work has been completed. Moreover, the status "Not performed" indicates that the stocktaking work is not performed. Then, the status "Now performing" indicates that the stocktaking work is being performed.

The controller 510 waits for selection via the operation device 570 (No in Step S8). In a case where the controller 510 determines that any one of the selection keys 807 receives an operation (Yes in Step S8), the processing of the controller 510 proceeds to Step S9. In Step S9, the controller 510 acquires from the server 300 the theoretical inventory in the allocated range indicated by a row corresponding to the selection key 807 that has received the operation. Moreover, the controller 510 acquires from the server 300 a stocktaking progress status (overall progress status) of the entire warehouse including the allocated range indicated by the row corresponding to the selection key 807 that has received the operation. Moreover, the controller 510 acquires from the server 300 the number of portable terminals 500 currently performing stocktaking in the warehouse. Subsequently, in Step S10, the controller 510 displays the work screen used for stocktaking.

Figure 14:
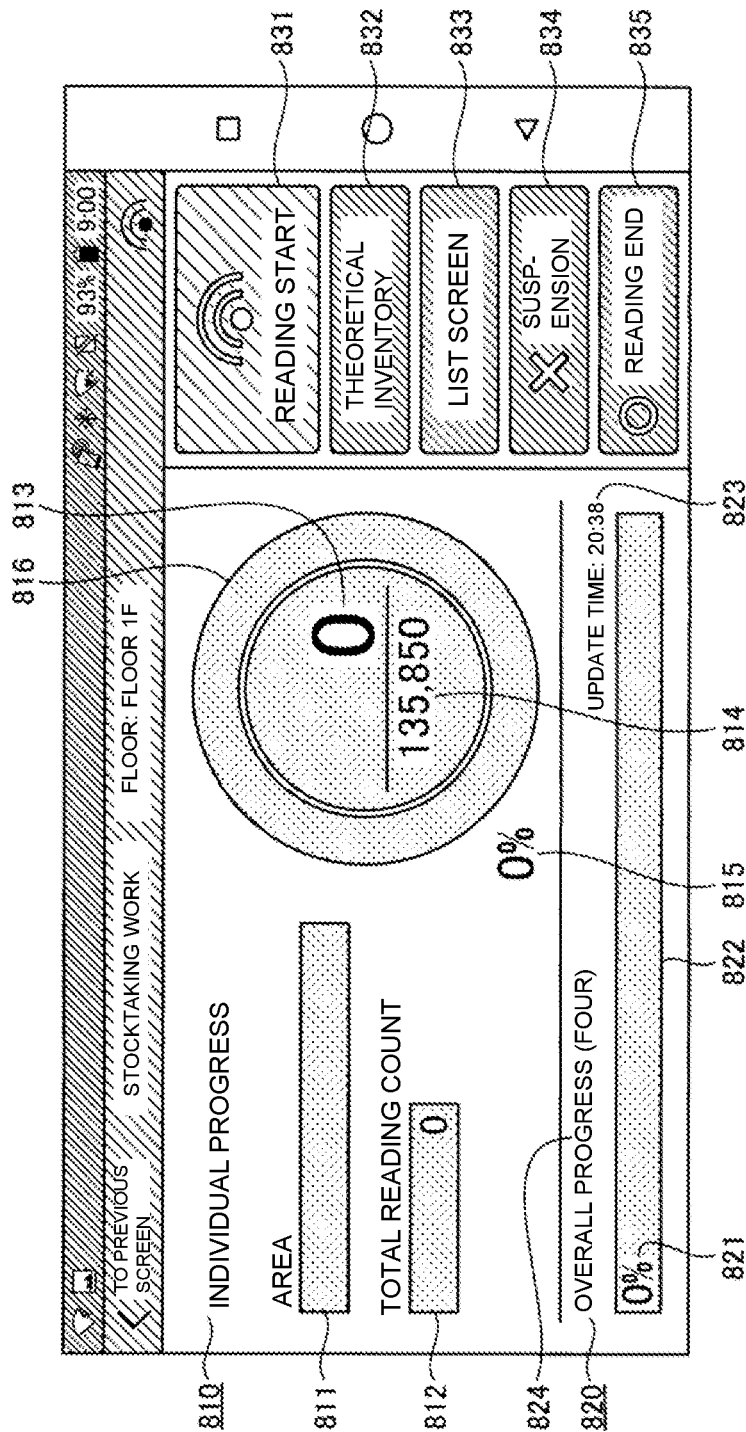
FIG. 14 is a diagram showing an example of a work screen before the start of reading according to the embodiment.
Figure 15:
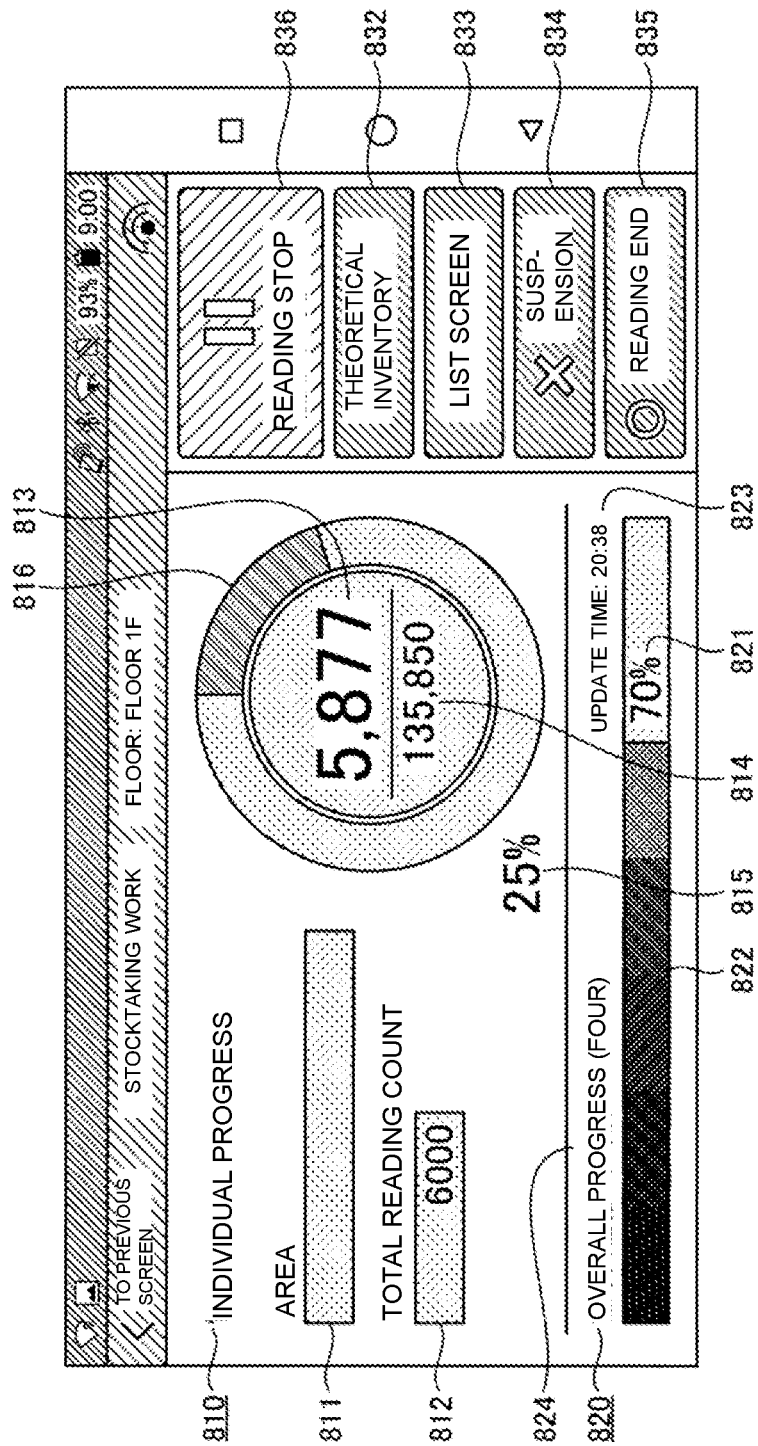
FIG. 15 is a diagram showing an example of the work screen during time of reading according to the embodiment.
Figure 16:
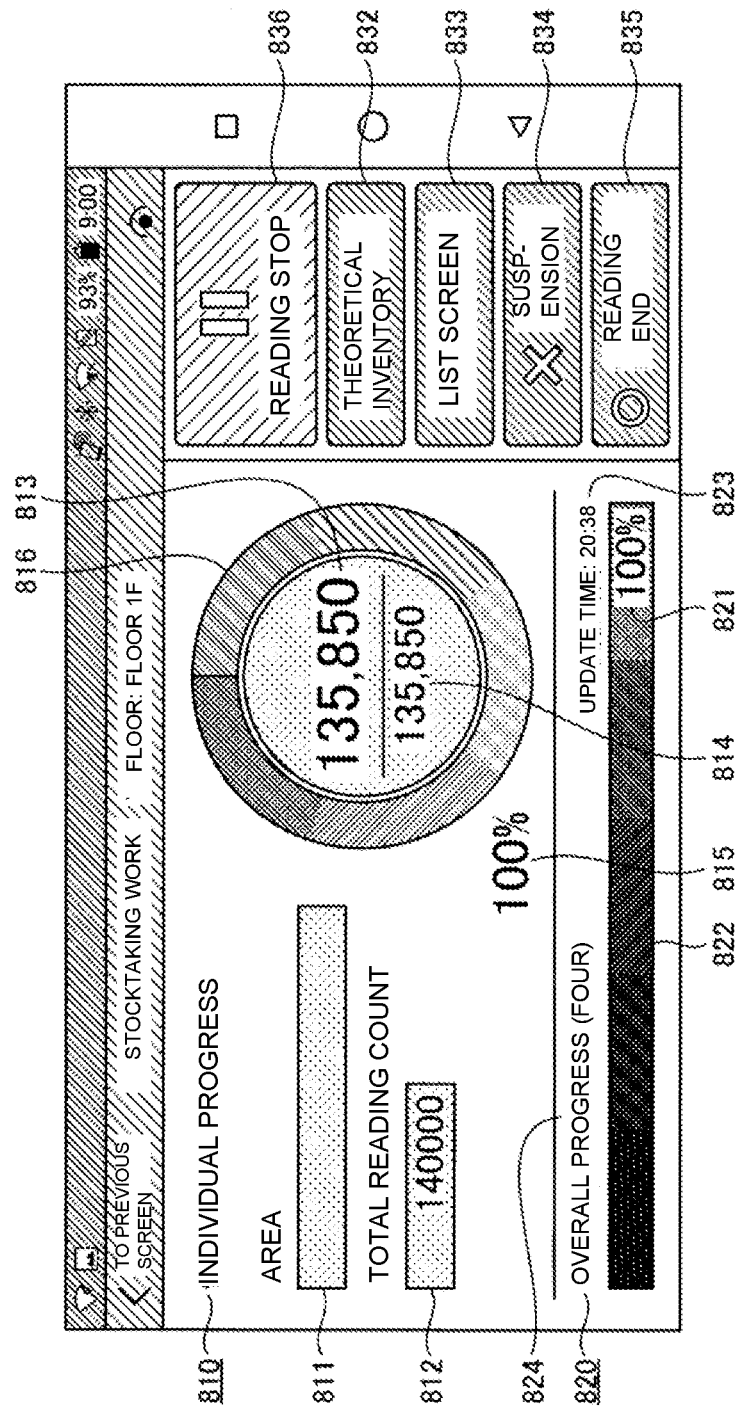
FIG. 16 is a diagram showing an example of the work screen at the end of reading according to the embodiment.

Here, the work screen will be described before the steps following Step S10 is described. FIGS. 14 to 16 each show an example of the work screen used for stocktaking. FIG. 14 is a work screen in a state before the start of reading, FIG. 15 is a work screen in a state during time of reading, and FIG. 16 shows a work screen in a state at the end of reading. For example, the work screen includes an individual progress display field 810 and an overall progress display field 820 as shown in FIG. 14. Moreover, the work screen shown in FIG. 14 includes various buttons 831 to 836.

As shown in FIG. 14, the individual progress display field 810 displays an allocated area 811, a total reading count 812, a reading count 813, a theoretical count 814, percentage 815, and a circle chart 816. The allocated area 811 indicates the name of an area which the portable terminal 500 is in charge of.

The total reading count 812 indicates the total number of RF tags read by the reader 400 connected to the portable terminal 500. The reading count 813 indicates the number of RF tags of the RF tags read by the reader 400 connected to the portable terminal 500, which excludes RF tags read two or more times and RF tags other than targets. The theoretical count 814 indicates the number of objects which the portable terminal 500 is in charge of (i.e., the number of RF tags that have to be read).

The percentage 815 indicates a value indicating what percentage of the theoretical count 814 the reading count 813 is. The circle chart 816 indicates the percentage 815 as a circle chart.

The display of the individual progress display field 810 is updated every time the management information 523 is updated during the time of reading of RF tags.

The overall progress display field 820 displays percentage 821, a bar chart 822, an update time 823, and the number of terminals 824. The percentage 821 indicates a value indicative of what percentage of stocktaking in the entire warehouse, which is currently performed by the portable terminal 500, has been finished. The bar chart 822 indicates the percentage 821 as a bar chart. The update time 823 is a time at which various types of information (overall progress information) to be displayed in the overall progress display field 820 is acquired from the server 300. Such a time is a time in Step S9 of FIG. 9. It should be noted that the overall progress information is information indicative of how many objects of all objects to be managed have been read. The number of terminals 824 indicates the number of portable terminals 500 currently performing stocktaking in the warehouse (the number of portable terminals 500 in Step S9 of FIG. 9).

The work screen before the start of reading, which is shown in FIG. 14, includes a reading start button 831, a theoretical inventory button 832, a list screen button 833, a suspension button 834, and a reading end button 835. The reading start button 831 becomes a reading stop button 836 after the start of reading (see FIG. 15 or 16). An operation received by each button 831 to 836 is entered into the controller 510 via the operation device 570 (touch panel).

When the reading start button 831 receives an operation, the controller 510 causes the reader 400 to start the work of reading tag information of RF tags by causing the antenna 441 to emit radio waves. When the reading stop button 836 (see FIG. 15 or 16) receives an operation, the controller 510 causes the reader 400 to temporarily stop reading of the tag information of the RF tags by causing the antenna 441 to stop emitting radio waves.

When the theoretical inventory button 832 receives an operation, the controller 510 switches the operation modes of the reader 400 and the portable terminal 500 to readable modes, focusing on the theoretical inventory to be worked. That is, when the operation modes of the reader 400 and the portable terminal 500 are switched to the readable modes, the controller 510 does not store in the memory 520 read data based on tag information of RF tags which are absent in the theoretical inventory out of the tag information entered through the reader 400.

Figure 17:
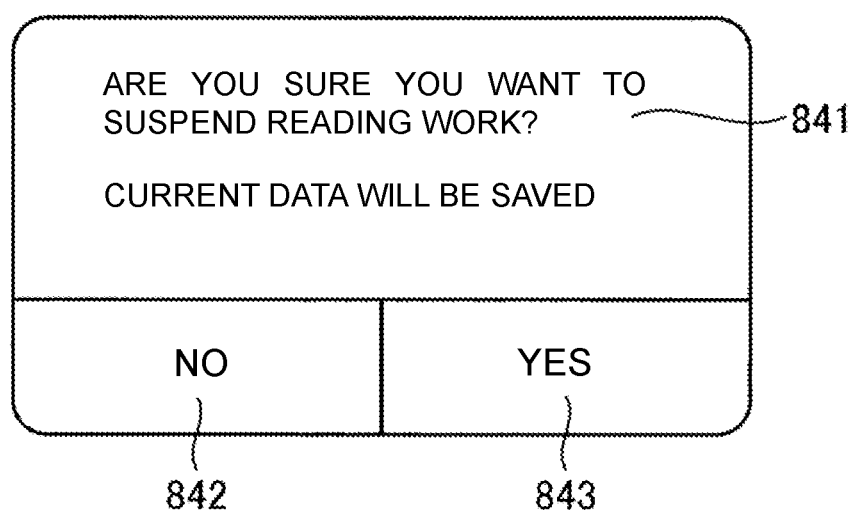
FIG. 17 is a diagram showing an example of a suspension confirmation screen according to the embodiment.

When the suspension button 834 receives an operation, the controller 510 stops emission of radio waves of the antenna 441 to thereby cause the reader 400 to suspend reading of the tag information of the RF tag. Moreover, in a case where the suspension button 834 receives an operation, the controller 510 causes the display device 560 to display a suspension confirmation screen (pop-up screen). FIG. 17 shows an example of the suspension confirmation screen. The suspension confirmation screen shown in FIG. 17 includes a text 841, a No button 842, and a Yes button 843.

The text 841 indicates a description of a confirmation item for suspension of reading and is "Are you sure you want to suspend reading work? Current data will be saved." for example. The No button 842 receives an operation to reject the confirmation item of the text 841. The Yes button 843 receives an operation to accept the confirmation item of the text 841. When the Yes button 843 receives an operation, the controller 510 saves the read data (tag information) that has been entered through the reader I/F 530 in the nonvolatile memory 520.

Figure 18:
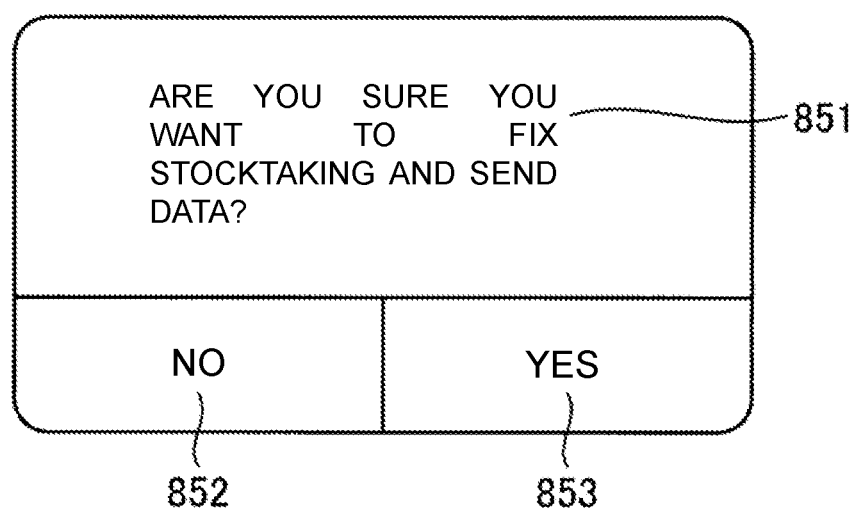
FIG. 18 is a diagram showing an example of an end confirmation screen according to the embodiment.

When the reading end button 835 receives an operation, the controller 510 causes the antenna 441 of the reader 400 to terminate emission of radio waves and causes the reader 400 to terminate reading of the RF tag. Moreover, when the reading end button 835 receives an operation, the controller 510 causes the display device 560 to display the end confirmation screen (pop-up screen). FIG. 18 shows an example of the end confirmation screen. The end confirmation screen shown in FIG. 18 includes a text 851, a No button 852, and a Yes button 853.

The text 851 indicates a description of a confirmation item for reading end and is "Are you sure you want to fix stocktaking and send data?" for example. The No button 852 receives an operation to reject the confirmation item of the text 851. The Yes button 853 receives an operation to accept the confirmation item of the text 851. When Yes button 853 receives an operation, the controller 510 sends to the server 300 the read data (tag information) that has been entered through the reader I/F 530 and saved in the nonvolatile memory 520.

Figure 19:
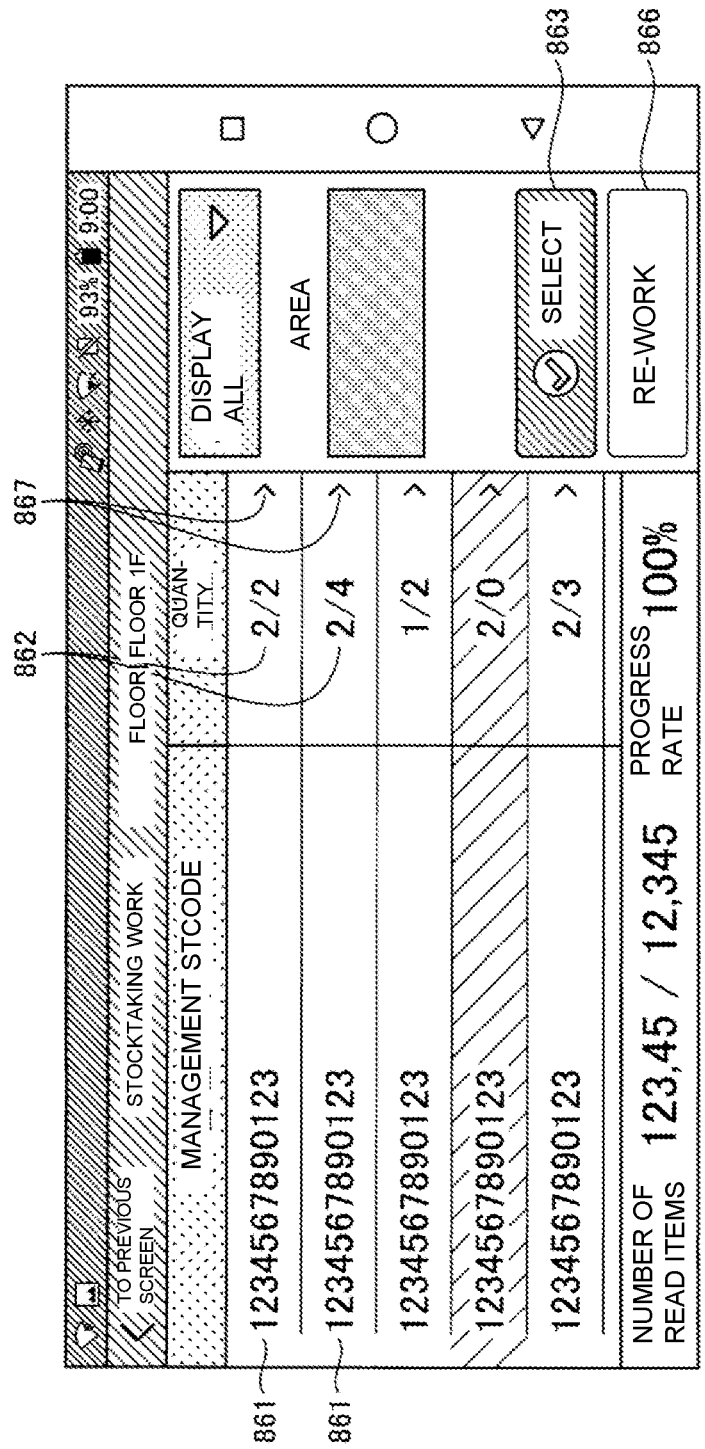
FIG. 19 is a diagram showing an example of a list screen according to the embodiment.
Figure 20:
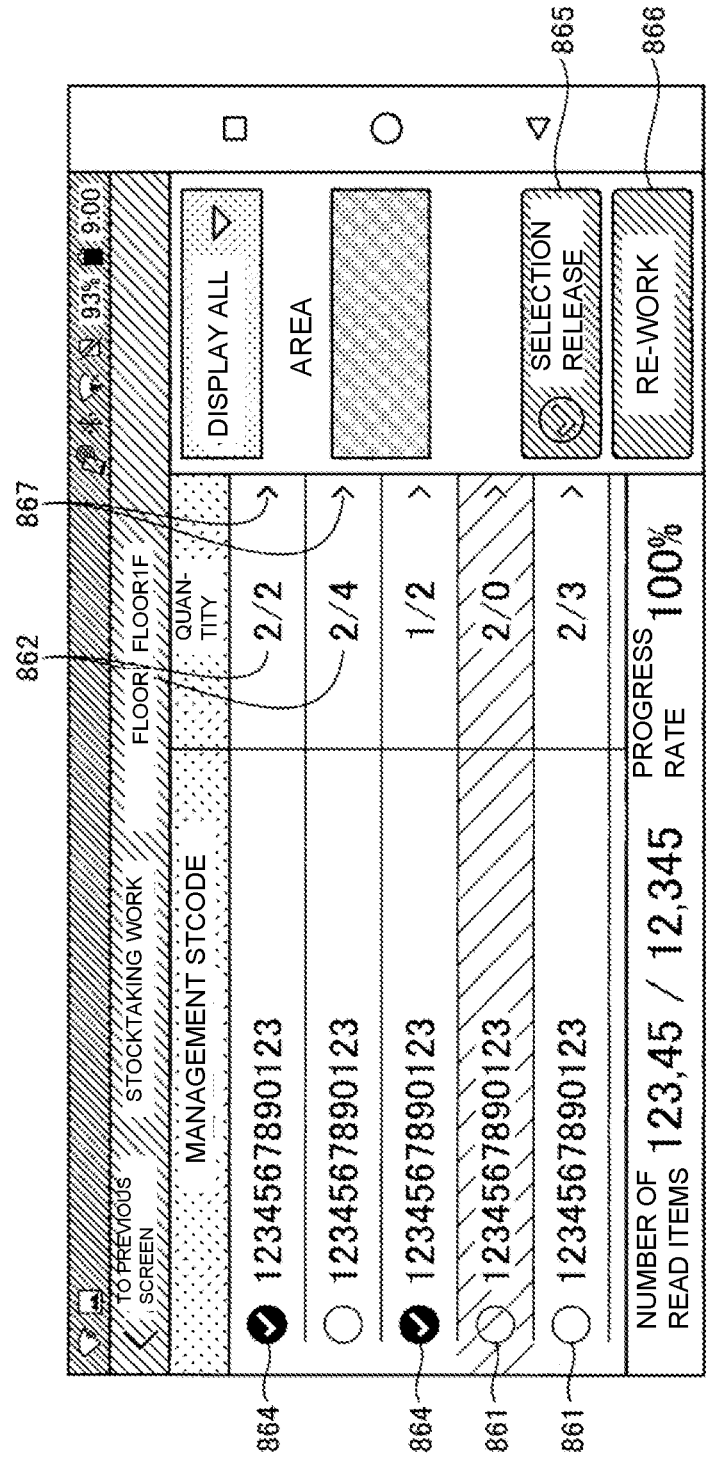
FIG. 20 is a diagram showing an example of the list screen according to the embodiment.

The list screen button 833 shown in FIG. 14 is a link that receives an operation for causing the display device 560 to display a list screen. FIGS. 19 and 20 each show an example of the list screen. The list screen displays a management code of objects which the portable terminal 500 is in charge of. In each row 861 of the list screen shown in FIG. 19, a reading count/theoretical count 862 of an object uniquely identified with each management code is also displayed.

When the select button 863 receives an operation, the controller 510 waits for an operation of selecting the row 861. When any one of the rows 861 is selected, a selection mark 864 is displayed in the selected row as shown in FIG. 20. Moreover, when a select button 863 shown in FIG. 19 receives an operation, a selection release button 865 is displayed instead of the select button 863 as shown in FIG. 20.

Moreover, a re-work button 866 is displayed on the list screen shown in FIG. 20 such that the re-work button 866 can be operated. When the re-work button 866 receives an operation, the controller 510 initializes read data in the selected row.

Figure 21:
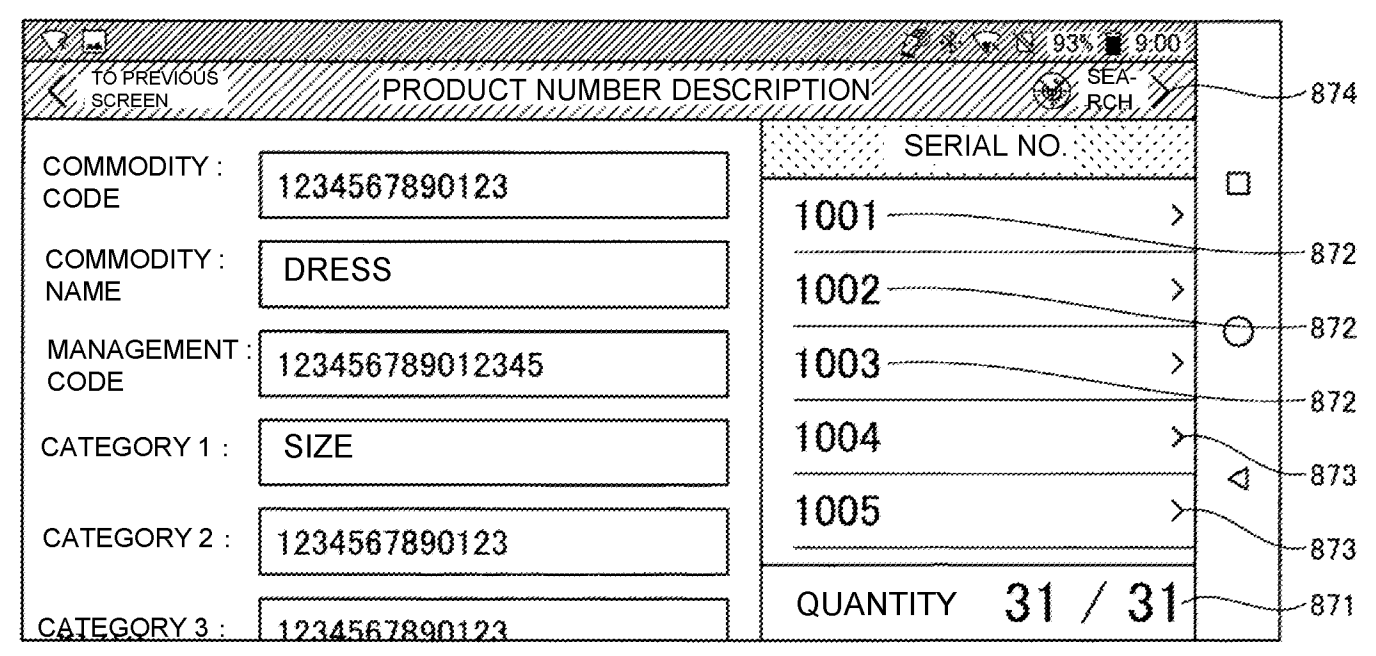

A selection key 867 is displayed in each row of the list screen shown in FIGS. 19 and 20. When any one of selection keys 867 receives an operation, the controller 510 causes the display device 560 to display the stock number description screen displaying detailed information of an object indicated by a management code in that row. FIG. 21 shows an example of the stock number description screen. The stock number description screen shown in FIG. 21 displays a reading count/theoretical count 871 of the object indicated by the management code besides a commodities code, a commodities name, a management code, various sorts. Moreover, the stock number description screen displays the serial number of each RF tag in a display field 872. A selection key 873 that receives an operation of selecting each row is provided in each row of the serial number.

Figure 22:
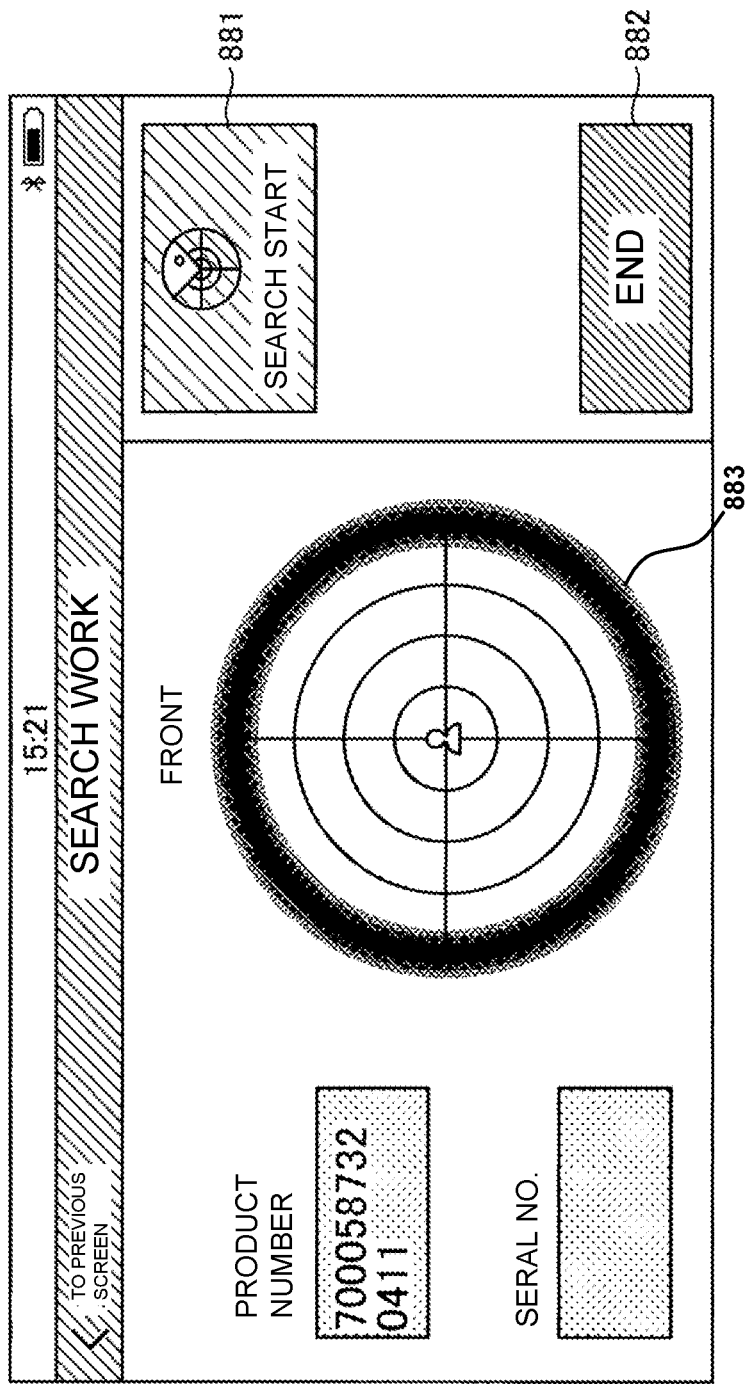
FIG. 22 is a diagram showing an example of a search screen according to the embodiment.

When the selection key 873 receives an operation, the controller 510 switches the operation modes of the reader 400 and the portable terminal 500 to the modes to search for the RF tag of the corresponding serial number. On the search modes, the controller 510 causes the display device 560 to display a search screen. FIG. 22 shows an example of the search screen. The search screen includes a search start button 881, an end button 882, and a position guide display portion 883. When the search start button 881 receives an operation, the controller 510 searches for a target RF tag. When the end button 882 receives an operation, the controller 510 causes the display device 560 to display the stock number description screen shown in FIG. 21 again.

In addition, the stock number description screen shown in FIG. 21 includes a search link 874. When the search link 874 receives an operation, the controller 510 causes the display device 560 to display the search screen. In a case where the screen of the display device 560 shifts to the search screen in accordance with an operation on the search link 874, the controller 510 switches the operation modes of the reader 400 and the portable terminal 500 to modes to search for those of the objects displayed on the stock number description screen, which have not been read.

Figure 23:
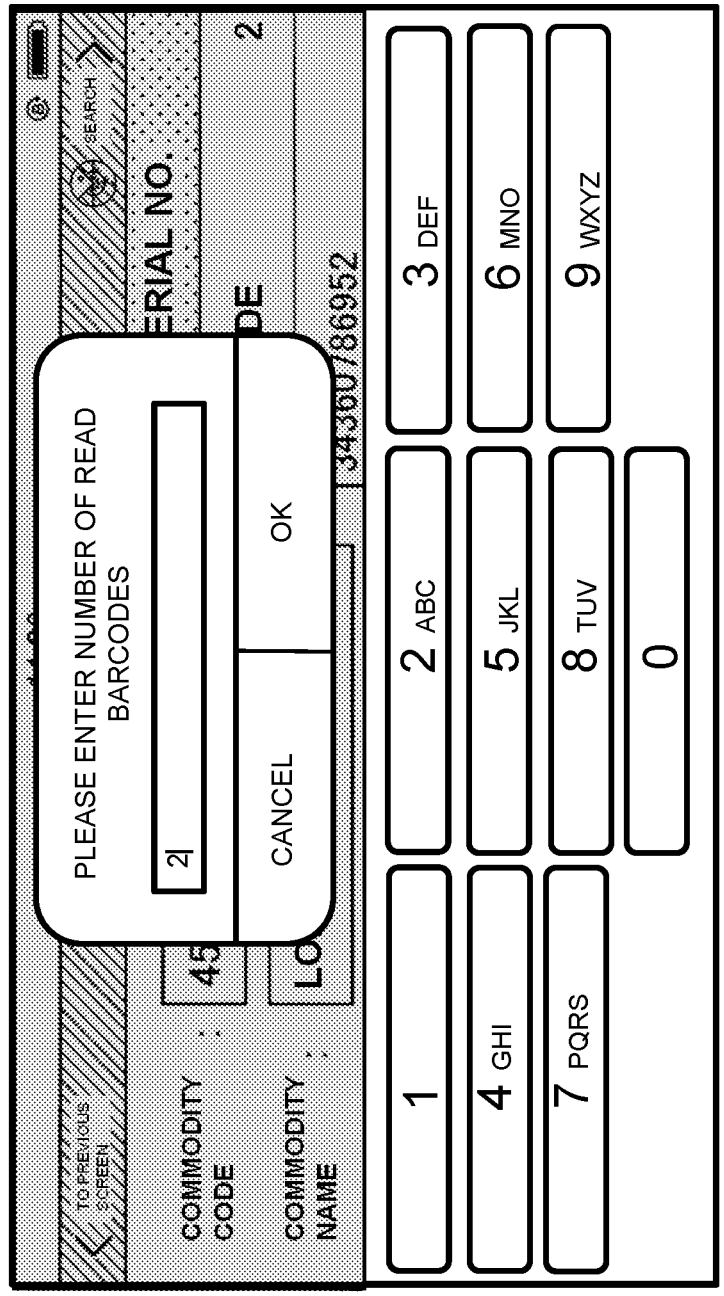
FIG. 23 is a diagram showing an example of a stock number description screen in a case of performing stocktaking using a barcode according to the embodiment.

FIGS. 23 and 24 each show an example of the stock number description screen in a case of performing stocktaking using a barcode. While the stock number description screen is displayed, the controller 510 also enables stocktaking using a barcode to be performed. Moreover, the number of items read can also be entered on the stock number description screen as shown in FIG. 23. When the number of items read is entered, the word "barcode" and the number of items read are displayed together in the display field 872 of the serial number as shown in FIG. 24.

Now referring back to FIG. 9, descriptions following Step S10 will be made. While the work screen is displayed, the controller 510 waits for an operation via the operation device 570 (No in Step S11). In a case where the controller 510 determines that the reading start button 831 receives the operation (Yes in Step S11), the processing of the controller 510 proceeds to Step S12. In Step S12, the controller 510 causes the reader 400 to start reading of the tag information of the RF tag. Subsequently, in Step S13, the controller 510 updates the management information 523 on the basis of the read data (tag information or the like) entered through the reader 400 and reflects the management information 523 on the display of the individual progress display field 810.

Subsequently, in Step S14, the controller 510 determines whether or not reading of the tag information of the RF tag in the allocated range has been completed. In a case where the controller 510 determines that reading of the tag information of the RF tag in the allocated range has not been completed (No in Step S14), the processing of the controller 510 returns to Step S12. Moreover, in Step S14, in a case where the controller 510 determines that reading of the tag information of the RF tag in the allocated range has been completed (Yes in Step S14), the processing of the controller 510 proceeds to Step S15. Then, in Step S15, the controller 510 sends the management information 523 to the server 300 and terminates this processing.

After that, in the portable terminal 500, the instruction 522 and the management information 523 which have been used become unnecessary, and thus the controller 510 deletes such information from the memory 520 before acquisition of the next instruction 522.

Figure 25:
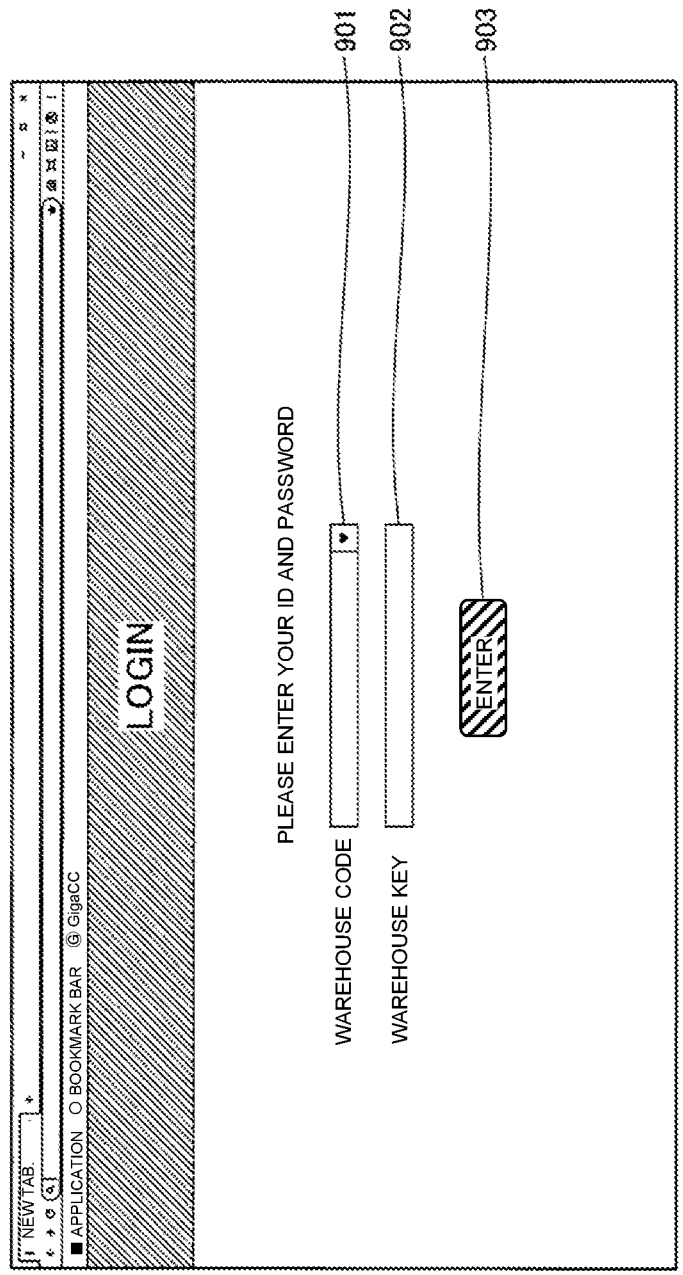
FIG. 25 is a diagram showing an example of a log-in screen displayed by a display device of a server 300 according to the embodiment.

Next, an operation of the server 300 will be described. FIG. 25 shows an example of a log-in screen displayed by the display device 340 of the server 300. In the information processing system 100 shown in FIG. 1, the controller 310 of the server 300 first causes the display device 340 to display the log-in screen and determines an input into a warehouse code entry field 901 and a warehouse key entry field 902 on the log-in screen. On the log-in screen shown in FIG. 25, the warehouse code entry field 901 receives selection of a warehouse code from a pull-down menu based on the warehouse master 321. The warehouse key entry field 902 receives an input of an authentication key through a keyboard.

Figure 26:
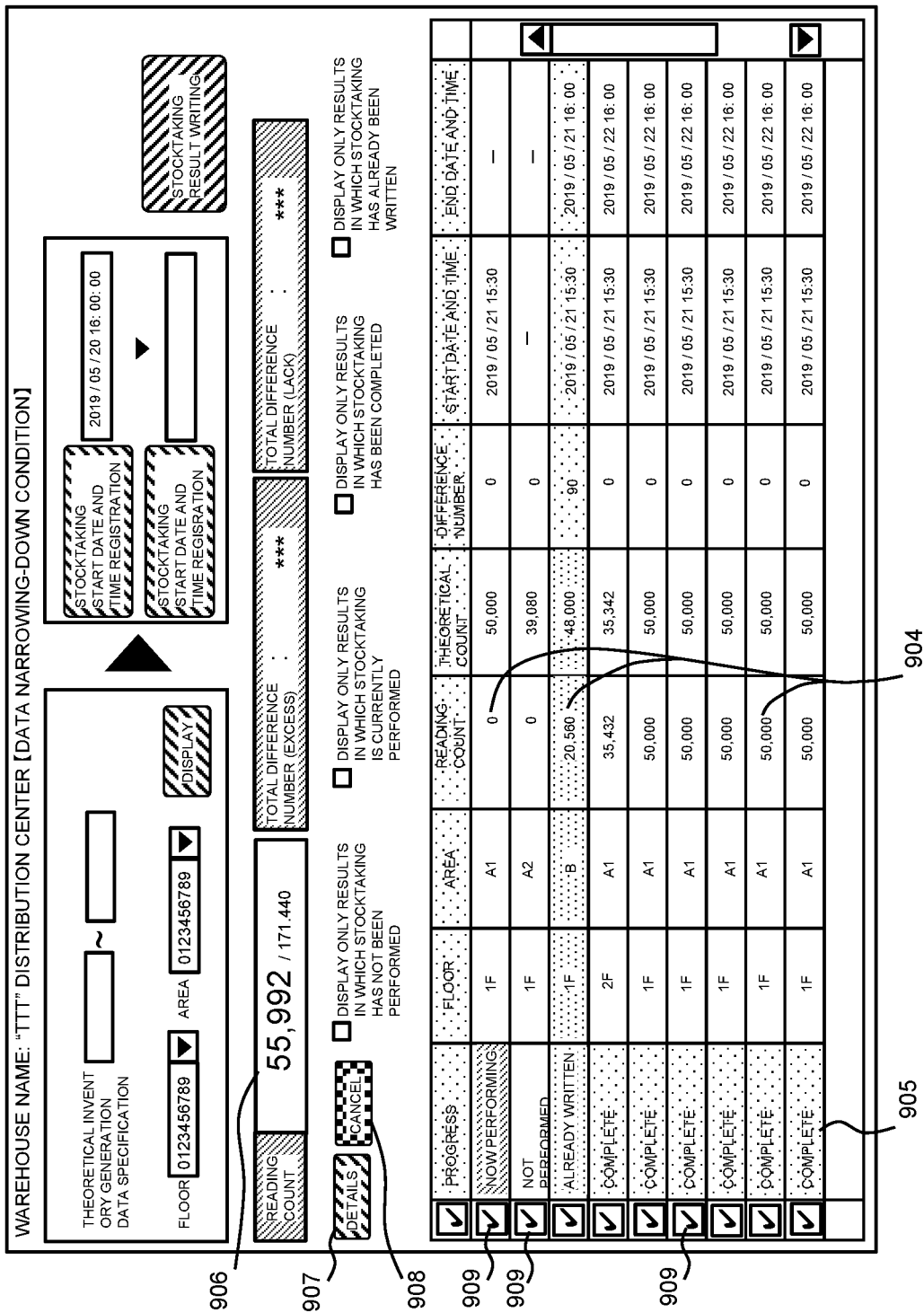
FIG. 26 is a diagram showing an example of a web stocktaking screen according to the embodiment.

When the warehouse code and the authentication key are entered on the log-in screen and an enter key 903 in the log-in screen is pressed, the controller 310 of the server 300 causes the display device 340 to display a web stocktaking screen. FIG. 26 shows an example of the web stocktaking screen. The web stocktaking screen displays a warehouse stocktaking progress status identified with the warehouse code on the basis of the management information 323 such that the warehouse stocktaking progress status can be narrowed-down with respect to the floor or area. On the web stocktaking screen shown in FIG. 26, narrowing-down display based on range specification using the date and time of loading of the theoretical inventory is also possible.

As shown in FIG. 26, each of rows 904 displayed as a list on the web stocktaking screen displays a status (progress status) 905 at the head of the row.

The status 905 includes "Not performed", "Already written", "Now performing", "Complete", and the like in a progress level order for example. "Not performed" indicates that stocktaking indicated by the row 904 has not been performed. "Already written" indicates that the stocktaking work has been completed and a result has been reflected on the WMS 200. "Now performing" indicates that the stocktaking indicated by the row 904 is currently performed by any one of the portable terminals 500. "Complete" indicates that any one of the portable terminals 500 has finished the stocktaking indicated by the row 904.

Moreover, the web stocktaking screen shown in FIG. 26 displays a total reading count 906 and the like in the narrowing-down range. The total reading count 906 set forth herein refers to the sum of the reading counts of the objects with the respective management codes contained in the management information 323. Then, the total reading count 906 is displayed in comparison with the sum of the theoretical counts, and thus overall progress can be grasped.

In addition, as shown in FIG. 26, the web stocktaking screen includes details button 907 and a delete button 908. Moreover, the web stocktaking screen includes a check box 909 for selecting each row 904. When the details button 907 receives an operation in a state in which any one of the check boxes 909 is checked, the controller 310 causes the display device 340 to display a detailed screen of the checked row 904. FIG. 27 shows an example of the detailed screen.

Each row 910 of the detailed screen shown in FIG. 27 corresponds to each row identified with the management code of the management information 323. This detailed screen displays a reading count 911 in the narrowing-down range or the like. The reading count 911 set forth herein refers to the sum of the reading counts of the objects with the management code displayed here and is displayed as compared to the sum of theoretical counts.

Moreover, the commodities code is displayed as a link 912 on the detailed screen shown in FIG. 27. When an operation of selecting the link 912 is made, the controller 310 causes the display device 340 to display the commodity details screen as a pop-up screen displayed superimposed on the detailed screen. FIG. 28 shows an example of the commodity details screen. The commodity details screen displays information narrowed down on the detailed screen with the commodities code of the object of the link 912 selected on the detailed screen.

In this manner, with the information processing system 100 according to the embodiment, the portable terminal 500 updates the display of the individual progress display field 810 every time the management information 523 is updated while the tag information of the RF tag is read. Accordingly, a progress status of stocktaking in an allocated range can be confirmed if necessary with the various numerical values 812, 813, and 814 as well as the circle chart 816 and the percentage 815.

Moreover, in accordance with the embodiment, the portable terminal 500 displays an overall progress status displayed in the overall progress display field 820 in accordance with an individual progress status such that it can be confirmed. Accordingly, in a case where multiple people perform stocktaking, the number of portable terminals 500 performing the stocktaking and the overall progress status can be grasped not relying on the server 300, and the remaining work can be anticipated through the portable terminal 500.

It should be noted that the tag reading apparatus according to the embodiment includes the reader 400 and the portable terminal 500 that are discrete apparatuses. However, the embodiment is not limited thereto and the tag reading apparatus may include an integrated apparatus having both a function corresponding to the reader 400 and a function corresponding to the portable terminal 500. In this case, the tag reading apparatus is an example of the information processing apparatus.

Moreover, in the embodiment, the reader/writer may be a reader/writer other than the handheld reader/writer. For example, a read-only reader may be used instead of the RFID reader/writer. Moreover, a reader/writer or a reader that reads IC tag information other than the RF tag may be used.

It should be noted that a program to be executed by the information processing apparatus according to the embodiment is provided, incorporated in advance in the ROM or the like.

The program to be executed by the information processing apparatus according to the embodiment may be provided, recorded in a computer-readable recording medium such as a CD-ROM, a flexible disk (FD), a CD-R, and a digital versatile disk (DVD) with a file in installable format or executable format.

In addition, the program to be executed by the information processing apparatus according to the embodiment may be stored in a computer connected to a network such as the Internet and provided by downloading via the network. Moreover, the program to be executed by the information processing apparatus according to the embodiment may be provided or delivered via a network such as the Internet.

The program to be executed by the information processing apparatus according to the embodiment has a module configuration including the respective blocks (the selecting unit 501, the acquisition unit 502, the reading unit 503, the updating unit 504, and the transmission unit 505). The CPU (processor) reads the program from the storage medium and executes the read program to thereby load the respective blocks into a main storage unit. Accordingly, the selecting unit 501, the acquisition unit 502, the reading unit 503, the updating unit 504, and the transmission unit 505 are generated in the main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus that sends/receives information to/from a server that comprehensively manages objects, to thereby manage a first portion of the objects which are within an allocated range, the information processing apparatus comprising:
    a communication device configured to send/receive information associated with the objects to be managed to/from the server;
    a reader configured to read, from a radio frequency tag attached to each of the objects, tag information stored in the radio frequency tag and output read data based on the tag information;
    a display device that includes a touch panel;
    a memory that stores information regarding the allocated range and the read data from the reader; and
    a controller configured to
        upon receipt of a selection of the allocated range through the touch panel of the display device, acquire, from the server via the communication device:
            information for identifying the first portion of the objects that are within the allocated range and to be read by the reader of the information processing apparatus, the first portion not including a second portion of the objects that are outside of the allocated range and to be read by one or more other information processing apparatuses,
            overall progress information indicating how many objects have been read by the reader of the information processing apparatus and said one or more other information processing apparatuses, and
            a total number of information processing apparatuses for managing the objects, including the information processing apparatus and said one or more other information processing apparatuses,
        store in the memory the acquired information for identifying the first portion of the objects within the allocated range as the information regarding the allocated range,
        generate individual progress information indicating how many objects have been read by the reader of the information processing apparatus on a basis of the information regarding the allocated range and the read data that are stored in the memory,
        cause the display device to display a first work screen including the individual progress information, the overall progress information, and the total number of information processing apparatuses,
        update the display of the individual progress information included in the first work screen at any time according to the reading by the reader of the information processing apparatus, and
        update the display of the overall progress information included in the first work screen every time the selection of the allocated range is received through the touch panel of the display device, wherein
    the first work screen simultaneously shows:
        a first number of objects that have been read by the reader of the information processing apparatus,
        a first chart indicating a percentage of the first number relative to a total number of the first portion of the objects,
        a second chart indicating a percentage of a second number of objects that have been read by the reader of the information processing apparatus and said one or more other information processing apparatuses, relative to a total number of the first and second portions of the objects, the second chart being of a type different from the first chart, and
        the total number of information processing apparatuses.

2. The information processing apparatus according to claim 1, wherein
    the controller is configured to send the read data to the server via the communication device at a predetermined timing.

3. The information processing apparatus according to claim 1, wherein
    the controller causes the display device to display, upon receipt of an input through the first work screen, a second work screen including the individual progress information and a list screen that displays a list of information regarding the objects located within the allocated range.

4. The information processing apparatus according to claim 3, wherein
    the controller causes the display device to display an operation element for receiving the input in the first work screen.

5. The information processing apparatus according to claim 4, wherein
    the controller, upon receipt of the input through the operation element, switches a display screen of the display device from the first work screen to the second work screen.

6. An information processing system comprising:
    a server that comprehensively manages objects; and
    an information processing apparatus that sends/receives information to/from the server, to thereby manage a first portion of the objects which are within an allocated range,
    the information processing apparatus including:
        a communication device configured to send/receive information associated with the objects to be managed to/from the server,
        a reader configured to read, from a radio frequency tag attached to each of the objects, tag information stored in the radio frequency tag and output read data based on the tag information, a display device that includes a touch panel,
a memory that stores information regarding the allocated range and the read data from the reader, and
a controller configured to:
  upon receipt of a selection of the allocated range through the touch panel of the display device, acquire, from the server via the communication device:
    information for identifying the first portion of the objects that are within the allocated range and to be read by the reader of the information processing apparatus, the first portion not including a second portion of the objects that are outside of the allocated range and to be read by one or more other information processing apparatuses,
    overall progress information indicating how many objects have been read by the reader of the information processing apparatus and said one or more other information processing apparatuses, and
    a total number of information processing apparatuses for managing the objects, including the information processing apparatus and said one or more other information processing apparatuses,
  store in the memory the acquired information for identifying the first portion of the objects within the allocated range as the information regarding the allocated range,
  generate individual progress information indicating how many objects have been read by the reader of the information processing apparatus on a basis of the information regarding the allocated range and the read data that are stored in the memory,
  cause the display device to display a first work screen including the individual progress information, the overall progress information, and the total number of information processing apparatuses,
  update the display of the individual progress information included in the first work screen at any time according to the reading by the reader of the information processing apparatus, and
  update the display of the overall progress information included in the first work screen every time the selection of the allocated range is received through the touch panel of the display device, wherein
the first work screen simultaneously shows:
  a first number of objects that have been read by the reader of the information processing apparatus,
  a first chart indicating a percentage of the first number relative to a total number of the first portion of the objects,
  a second chart indicating a percentage of a second number of objects that have been read by the reader of the information processing apparatus and said one or more other information processing apparatuses, relative to a total number of the first and second portions of the objects, the second chart being of a type different from the first chart, and
  the total number of information processing apparatuses.

7. The information processing system according to claim 6, wherein
the controller is configured to send the read data to the server via the communication device at a predetermined timing.

8. The information processing system according to claim 6, wherein
the controller causes the display device to display, upon receipt of an input through the first work screen, a second work screen including the individual progress information and a list screen that displays a list of information regarding the objects located within the allocated range.

9. An information processing method for an information processing apparatus that sends/receives information to/from a server that comprehensively manages objects, to thereby manage a first portion of the objects which are within an allocated range, the information processing method comprising:
  upon receipt of a selection of the allocated range through a touch panel of a display device, acquiring from the server:
    information for identifying the first portion of the objects that are within the allocated range and to be read by a reader of the information processing apparatus, the first portion not including a second portion of the objects that are outside of the allocated range and to be read by one or more other information processing apparatuses,
    overall progress information indicating how many objects have been read by the reader of the information processing apparatus and said one or more other information processing apparatuses, and
    a total number of information processing apparatuses for managing the objects, including the information processing apparatus and said one or more other information processing apparatuses;
  storing in a memory the acquired information for identifying the first portion of the objects within the allocated range as information regarding the allocated range;
  causing the reader to read, from a radio frequency tag attached to each of the objects, tag information stored in the radio frequency tag and storing, in the memory, read data based on the tag information;
  generating individual progress information indicating how many objects have been read by the reader of the information processing apparatus on a basis of the information regarding the allocated range and the read data that are stored in the memory;
  causing the display device to display a work screen including the individual progress information, the overall progress information, and the total number of information processing apparatuses;
  updating the display of the individual progress information included in the work screen at any time according to the reading by the reader of the information processing apparatus; and
  updating the display of the overall progress information included in the work screen every time the selection of the allocated range is received through the touch panel of the display device, wherein
the first work screen simultaneously shows:
  a first number of objects that have been read by the reader of the information processing apparatus,
  a first chart indicating a percentage of the first number relative to a total number of the first portion of the objects,
  a second chart indicating a percentage of a second number of objects that have been read by the reader of the information processing apparatus and said one or more other information processing apparatuses, relative to a total number of the first and second portions of the objects, the second chart being of a type different from the first chart, and
the total number of information processing apparatuses.

\* \* \* \* \*